US005791578A

United States Patent [19]
Kurokawa et al.

[11] Patent Number: 5,791,578
[45] Date of Patent: Aug. 11, 1998

[54] RECORDING MEDIUM DEVICE WITH MEMORY TERMINALS AND SHUTTER SIZED AND SHAPED IN RELATION THERETO

[75] Inventors: Toshiya Kurokawa, Kanagawa; Joichi Daiba, Tokyo; Satoshi Ota, Chiba; Mitsunori Sakama; Katsumi Maekawa, both of Tokyo; Tadashi Ozue, Kanagawa, all of Japan

[73] Assignee: Sony Corporation, Tokyo, Japan

[21] Appl. No.: 635,951

[22] PCT Filed: Sep. 6, 1995

[86] PCT No.: PCT/JP95/01774

§ 371 Date: Jul. 1, 1996

§ 102(e) Date: Jul. 1, 1996

[87] PCT Pub. No.: WO96/08013

PCT Pub. Date: Mar. 14, 1996

[30] Foreign Application Priority Data

Sep. 6, 1994 [JP] Japan ................. 6-212756
Sep. 6, 1994 [JP] Japan ................. 6-212757
Sep. 6, 1994 [JP] Japan ................. 6-212758
Sep. 6, 1994 [JP] Japan ................. 6-212759

[51] Int. Cl.$^6$ .............................................. G03B 23/02
[52] U.S. Cl. ................... 242/338.3; 242/344; 242/347.1; 360/132
[58] Field of Search ................. 242/338, 338.3, 242/344, 347, 347.1; 360/132, 96.5, 96.6

[56] References Cited

U.S. PATENT DOCUMENTS

| 4,383,285 | 5/1983 | Staar | 360/132 |
| 4,579,295 | 4/1986 | Harada | 242/338.3 |
| 4,903,915 | 2/1990 | Iwahashi | 242/338.3 |
| 5,255,144 | 10/1993 | Iwahashi et al. | 360/132 |
| 5,348,244 | 9/1994 | Nakagawa | 242/338.3 |
| 5,390,870 | 2/1995 | Sawada et al. | 242/344 |
| 5,412,525 | 5/1995 | Ota et al. | 360/132 |
| 5,433,398 | 7/1995 | Sawada | 360/132 X |
| 5,455,722 | 10/1995 | Fujii et al. | 360/132 X |
| 5,479,312 | 12/1995 | Masuda et al. | 360/132 |
| 5,506,736 | 4/1996 | Ota | 242/344 X |
| 5,506,739 | 4/1996 | Iwahashi | 360/132 |
| 5,541,796 | 7/1996 | Sawada | 360/132 |
| 5,636,094 | 6/1997 | Schoettle et al. | 360/132 |
| 5,638,239 | 6/1997 | Ohgi | 360/132 |

*Primary Examiner*—Donald P. Walsh
*Assistant Examiner*—William A. Rivera
*Attorney, Agent, or Firm*—Jay H. Maioli

[57] ABSTRACT

A recording medium device has a cartridge main body housing a recording medium configured for recording information signals. The recording medium device includes the cartridge main body housing the magnetic tape, contact terminals arranged facing the outside of the cartridge main body for functioning as electrical contacts for a drive unit, and a shutter member arranged on the cartridge main body for opening and closing the contact terminals. The contact terminals face outwardly of the cartridge main body via an opening formed in the outer peripheral wall of the cartridge main body. When not loaded on the drive unit, the shutter member is held at a position closing the opening formed in the cartridge main body. When loaded on the drive unit, the shutter member is moved by a shutter opening mechanism mounted in the drive unit to a position uncovering the opening for exposing the contact terminals to the outside of the cartridge main body. The shutter member is perpetually biased by a biasing unit in a direction of closing the opening. Since the contact terminals are covered by the shutter member, they are safeguarded against deposition of dust and dirt.

25 Claims, 23 Drawing Sheets

5,791,578

RECORDING MEDIUM DEVICE WITH MEMORY TERMINALS AND SHUTTER SIZED AND SHAPED IN RELATION THERETO

TECHNICAL FIELD

This invention relates to a recording medium device comprising of a disc-shaped recording medium, such as a tape-shaped recording medium, e.g., a magnetic tape having information signals recorded thereon, or a disc-shaped recording medium, e.g., an optical disc or a magneto-optical disc, enclosed in a cartridge main body. More particularly, it relates to a recording medium device having a contact terminal for electrically connecting electrical components, such as a memory elements, housed within the cartridge main body, to the recording and/or reproducing apparatus when the device is loaded on a recording and/or reproducing apparatus configured for recording and/or reproducing information signals.

BACKGROUND ART

Up to now, a tape cartridge is employed as a recording medium for a recording and/or reproducing apparatus for a tape recorder or a video tape recorder. This tape cartridge has a cartridge main body formed by abutting a rectangular upper cartridge half and a rectangular lower cartridge half. A pair of tape reels are rotatably accommodated within the cartridge main body and a magnetic tape for recording information signals, such as audio or picture signals, is placed around these tape reels. The magnetic tape is reeled out from one of the tape reels on the tape supply side to outside of the cartridge main body so as to travel along the front side of the cartridge main body for being taken up by the opposite side tape reel on the tape take-up side.

On the front side of the cartridge main body, within which runs a magnetic tape reeled out from one of the tape reels and taken out on the opposite tape reel, there is formed a loading recess into which part of a loading mechanism adapted for loading a magnetic tape in a tape running path within the recording and/or reproducing apparatus is introduced.

The cartridge main body is fitted with a front cover for opening or closing the front side of the cartridge main body formed with the loading recess along which runs the magnetic tape reeled out from the tape reel. The front cover is mounted with a rotational bias produced by a spring member in a direction of closing the front side of the cartridge main body. In the non-use state of not being fitted on the recording and/or reproducing apparatus, the front cover covers the magnetic tape extended on the front side of the cartridge main body for protecting the magnetic tape. When the tape cartridge is loaded on the recording and/or reproducing apparatus, the front cover is turned by a lid opening member mounted in the recording and/or reproducing apparatus for opening the front side of the cartridge main body for enabling loading of the magnetic tape in the tape running path.

With this sort of the tape cartridge, the magnetic tape may differ in design statements even though the outer shape of the cartridge main body is the same. For example, in the case of a tape cartridges housing a magnetic tape having a tape width of 8 mm, some of them are used as a recording medium for a drive device as an external recording device for an information processing apparatus, such as a computer, for exclusively recording data signals as digital signals, while others are used as a recording media for video tape recorders for exclusively recording picture or audio signals. The tape cartridge employed for recording data signals and the tape cartridge employed for recording picture or audio signals are designed so that a magnetic tape having a tape width of 8 mm is housed within the cartridge main body having a unified size and a substantially common outer shape. Thus it is extremely difficult to distinguish a tape cartridge employed for recording data signals and a tape cartridge employed for recording picture and audio signals.

Meanwhile, the tape cartridge employed for recording the data signals and the tape cartridge employed for recording the picture and audio signals differ with respect to the design statements of the recording media. The tape cartridge employed for recording the data signals has a storage capacity larger than that of the tape cartridge employed for recording the picture and audio signals such that demand for error rate assurance for data signals recorded thereon is higher than with the magnetic tape employed in the tape cartridge employed for recording the picture and audio signals. Thus, if the tape cartridge for recording the picture or audio signals is inadvertently loaded on a drive device employed as an external recording device of an information processing apparatus and employed as a tape cartridge for recording data signals, the recording capacity may be insufficient so that required data signals fail to be recorded or undergo dropout. For avoiding such inconvenience, the cartridge main body of the conventional tape cartridge is provided with a detecting hole for discriminating whether the tape cartridge is designed for recording data signals or for recording picture or audio signals. The detection hole enables discrimination of the design statements of the magnetic tape accommodated in the cartridge main body by visual check while enabling discrimination of the design statements of the loaded tape cartridge by mechanical discrimination means provided on the recording and/or reproducing apparatus.

With the conventional tape cartridge, it has been proposed to provide a portion of the cartridge main body with a detection hole for identifying the design statements of the magnetic tape. However, it is difficult with this mechanical identification means to provide a large number of sorts of the identification information, such that it is possible to make identification indication of limited sorts of the information.

As for the tape cartridge, the contents of the information signals recorded on the magnetic tape are stated on e.g., a label stuck on the cartridge main body. However, since limitations are imposed on the size of the label, it is difficult to record a large number of sorts of the information. On the other hand, the contents of the tape cartridge that need be kept confidential cannot be recorded on the label. If such label is used, it is necessary to take out the tape cartridges one by one from a rack if a large number of tape cartridges are housed in such rack and a required one is to be selected. If the label is peeled off or contaminated or the contents of the tape cartridge are not stated thereon, the tape cartridge needs to be loaded on the recording and/or reproducing apparatus and reproduced for checking the contents by a laborious operation.

The JP Utility Model Kokai Publication JP-A-63-105983 discloses a tape cartridge which has overcome such inconvenience. The tape cartridge disclosed in the Publication has a memory IC loaded in the inside of the cartridge main body as a memory element capable of recording information signals.

The tape cartridge, having the memory IC loaded thereon, is configured so that a variety of information items, such as the design statements, state of use, recording position or the contents of the recorded information signals of the magnetic tape, will be stored in the memory IC.

When the tape cartridge is loaded on a recording and/or reproducing apparatus, the identification information stored in a memory I/C is read out prior to loading the magnetic tape, while the new identification information is stored by an auxiliary recording and/or reproducing apparatus at the time of termination of the recording/reproducing operation. Thus, with the tape cartridge, a variety of identification information data are utilized for increasing the range of application of the tape cartridge, which is highly meritorious when handling a large quantity of the tape cartridges.

For example, when carrying out automatic reproduction or recording with the tape cartridge having the memory IC loaded thereon by utilizing the above-mentioned rack device, since the required identification information may be easily acquired from the memory IC without loading the magnetic tape each time, the retrieval time may be shortened advantageously.

Meanwhile, the tape cartridge having the auxiliary storage device comprising the memory IC loaded thereon needs to be electrically connected to the auxiliary recording and/or reproducing apparatus when reproducing the identification information stored in the memory IC or storing the identification information in the memory IC. To this end, the main cartridge body of the tape cartridge is provided with a contact terminal connected to the memory IC. When the tape cartridge is loaded on the recording and/or reproducing apparatus, the terminal members of the auxiliary recording and/or reproducing apparatus are connected to the contact terminals for input/output of the identification information.

Meanwhile, the contact terminal provided on the cartridge main body, configured for electrical connection with the terminal members of the auxiliary recording and/or reproducing apparatus, needs to be exposed to the outside of the main cartridge body. The contact terminals provided on the conventional tape cartridge remains exposed to the outside at all times. Thus, with the conventional tape cartridge, dust and dirt tend to be affixed to the contact terminals exposed outside the cartridge main body, thus frequently leading to contamination of the contact terminals or corrosion of gold plating applied on the front surface. The result is contact defect in the terminal members of the auxiliary recording and/or reproducing means and failure in recording the identification information on the memory IC or reproduction of the identification information from the memory IC. On the other hand, dust and dirt tend to intrude into the inside of the main cartridge body from the site of the contact terminals to be affixed on the magnetic tape to deteriorate recording/reproducing characteristics.

DISCLOSURE OF THE INVENTION

It is an object of the present invention to provide a recording and/or reproducing apparatus whereby the contact terminals provided on the cartridge main body for electrical connection with a drive device may be safeguarded against damage even though they are reliably available for electrical connection with the driving device.

It is another object of the present invention to provide a recording and/or reproducing apparatus whereby affixation of dust and dirt to and corrosion of the contact terminals provided on the cartridge main body may be prohibited from occurring for realization of reliable and stable electrical connection with the drive device at all times.

It is a further object of the present invention to provide a recording and/or reproducing apparatus whereby the contact terminals provided on the cartridge main body may be easily and reliably exposed to the outside.

It is a further object of the present invention to provide a recording medium device in which, when the device is in the out-of-use state, as when it is laid in store without being loaded on a drive device, its contact terminals are not caused to face outward and affixation of impurities can be reliably prohibited.

It is a further object of the present invention to provide a recording medium device in which its contact terminals are caused to face outward in connection with loading on the drive device to enable facilitated opening/closure of the contact terminals.

It is a further object of the present invention to provide a recording medium device in which a variety of information data, such as design statements or use state of the recording medium stored in the cartridge main body or the recording positions or the contents of the recorded information signals and in which a variety of information data can be promptly retrieved and correctly recorded or reproduced on or from the recording medium.

It is yet another object of the present invention to provide a recording medium device in which the information can be written in or read out from storage elements, accommodated in the cartridge main body without the necessity of loading the recording medium housed in the cartridge main body on the recording and/or reproducing apparatus.

A recording medium device according to the present invention, proposed for achieving the above-mentioned object, has a cartridge main body housing a recording medium configured for recording information signals thereon, contact terminals arranged facing to the outside of the cartridge main body for functioning as electrical contacts for a drive unit, and a shutter member arranged on the cartridge main body for opening and closing the contact terminals. The contact terminals are exposed to outside of the cartridge main body via an opening formed in the outer peripheral wall of the cartridge main body.

When in a state of being not loaded on the drive unit the shutter member is held in a position of closing the opening and, when loaded on the drive unit the shutter member is moved by shutter opening means arranged on the drive unit to a position of opening the opening for exposing the contact terminals to outside of the cartridge main body.

The biasing means biases the shutter member in a direction of closing the opening.

There is mounted a memory device in the cartridge main body for being electrically connected to the contact terminals for storing the identification information of the recording medium. There is provided a wiring substrate carrying the memory device. The contact terminal is provided on the wiring substrate.

There is provided positioning means within the cartridge main body for being engaged with mating positioning means for setting the loading position of the cartridge main body for setting the relative contact position between the contact terminals and connection means provided in the driving unit.

The cartridge main body is integrally formed with a rotating section for rotating a connection terminal mechanism provided in the driving unit towards the contact terminals.

A recording medium device, similarly proposed by the present invention, has a cartridge main body having a through-hole formed therein, a pair of tape reels rotatably supported within the cartridge main body and having flanges, a tape-shaped recording medium placed around the tape reels, biasing means, and a reel lock mechanism having a lock lever and a reel unlock member. The lock lever is rotationally biased by the biasing means in a direction of engaging with the flanges of the tape reels, and is engaged with the flanges for limiting rotation of the tape reels. The reel unlock member at least partially faces the through-hole formed in the cartridge main body adapted for being engaged by actuating means provided in the driving unit. The reel unlock member is moved by the actuating means engaged with the through-hole for moving the lock lever away from the flange of the tape reels against the bias of the biasing means. The recording medium device also has a memory device enclosed within the cartridge main body for storing the identification information of the tape-shaped recording medium, contact terminals electrically connected with the cartridge main body for functioning as electrical contacts for the drive unit, and a shutter member moved in association with the reel unlock member of the reel lock mechanism for opening and closing the contact terminals.

A recording medium device, similarly proposed by the present invention, has a cartridge main body, a pair of tape reels rotatably supported within the cartridge main body and having flanges, a tape-shaped recording medium placed between the tape reels, a front lid pivotally mounted on the cartridge main body for opening and closing the front side of the cartridge main body along which extends the tape-shaped recording medium reeled out from one of the tape reels so as to be taken up on the other tape reel, a memory device enclosed within the cartridge main body for storage of the identification information of the tape-shaped recording medium, contact terminals electrically connected with the memory device for functioning as electrical contacts for the driving unit, and a shutter member for opening and closing the contact terminals in association with rotation of the front lid.

With the above-described recording medium device according to the present invention, the contact terminals are covered by the shutter member provided on the cartridge main body and hence are protected against an external force and deposition of dust and dirt by the shutter member. Thus the contact terminals are perpetually kept in the clean state. When the recording medium device is loaded on the drive unit, the shutter member is moved by an opening mechanism provided on the drive unit for facing the contact terminals to outside of the cartridge main body. Thus the connector device for the external equipment, connected to the contact terminals, is safeguarded against collision and resulting destruction of the connection terminals against the shutter member for assuring positive connection to the contact terminals.

Since the identification information, such as contents of information signals stored in the recording medium housed within the cartridge main body, design statements or the state of use of the recording medium is written in the memory device by an auxiliary memory unit independent of the drive unit configured for recording and/or reproducing information signals on or from the recording medium, the identification information is retrieved by the auxiliary recording/reproducing unit without the necessity of loading the recording medium device on the driving unit for reproduction. Thus a variety of control operations may be carried out on the recording medium device based upon the retrieved identification information. The updated identification information is sequentially supplied in the memory elements of the auxiliary memory unit via contact terminals constructed as input/output terminals.

Since the memory elements housed within the cartridge main body may be arranged in a space for the wiring substrate not affecting the housing of the recording medium in the cartridge main body, there is no necessity of modifying the basic construction of the tape cartridge as the recording medium device. Thus the conventional tape cartridge may be provided with the memory elements for improving its function without the necessity of drastic design changes.

On the other hand, the positioning section provided in the cartridge main body is engaged with the positioning member on the drive unit for setting the loading position of the cartridge main body with respect to the drive unit. Thus the contact terminals may be electrically connected reliably with the connector devices of the external equipment.

Since the above-described recording medium device, configured for opening and closing the shutter member in association with the reel lock mechanism moved by the reel unlock member of the drive unit, is able to face the contact terminals to the outside of the cartridge main body in association with the loading thereof on the recording and/or reproducing apparatus, the contact terminals may be opened easily and reliably.

With the recording medium device having a shutter member moved by the opening movement of the front cover rotatably mounted on the cartridge main body, the contact terminals may be exposed to the outside of the cartridge main body in association with the loading thereof on the recording and/or reproducing apparatus, and the contact terminals may be opened easily and reliably.

Since the biasing member biases the shutter member of the tape cartridge in a direction of closing the shutter member, the contact terminals may be exposed to the outside only when the tape cartridge is loaded on the recording and/or reproducing apparatus, so that the contact terminals may be protected reliably.

BEST MODE FOR CARRYING OUT THE INVENTION

Figure 1:
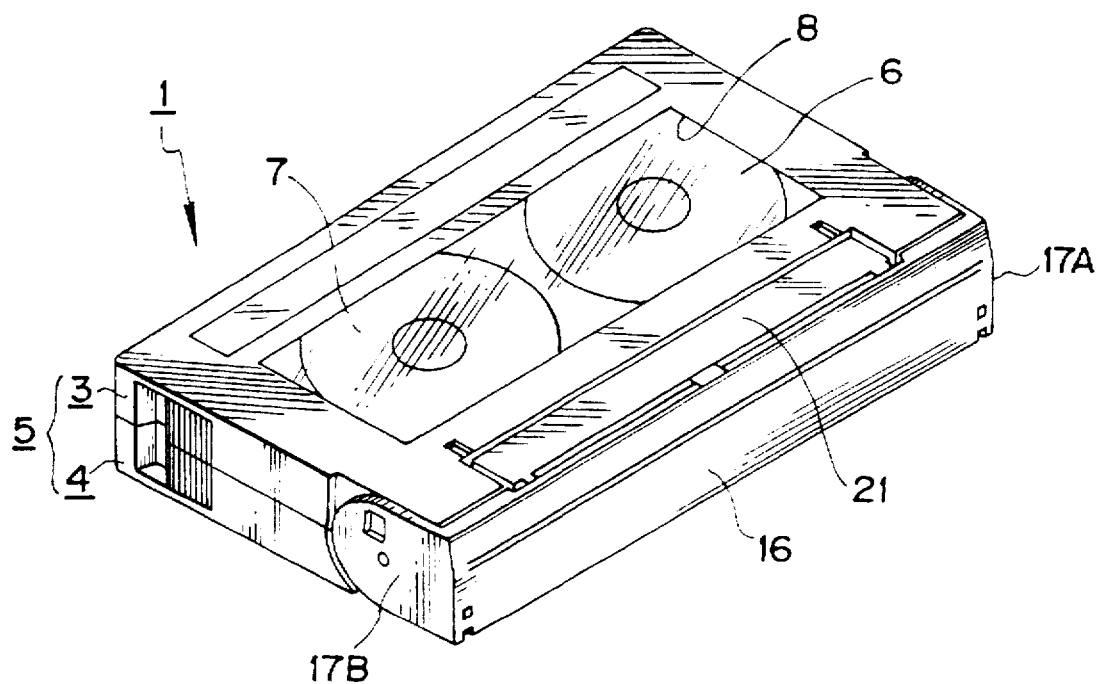
FIG. 1 is a perspective view of a tape cartridge having a memory IC housed within a cartridge main body.

Referring to the drawings, illustrative embodiments of the present invention will be explained in detail.

In the following embodiment, the present invention is applied to a tape cartridge in which a magnetic tape in the form of a tape-shaped recording medium is housed as a recording medium within a cartridge main body.

Figure 2:
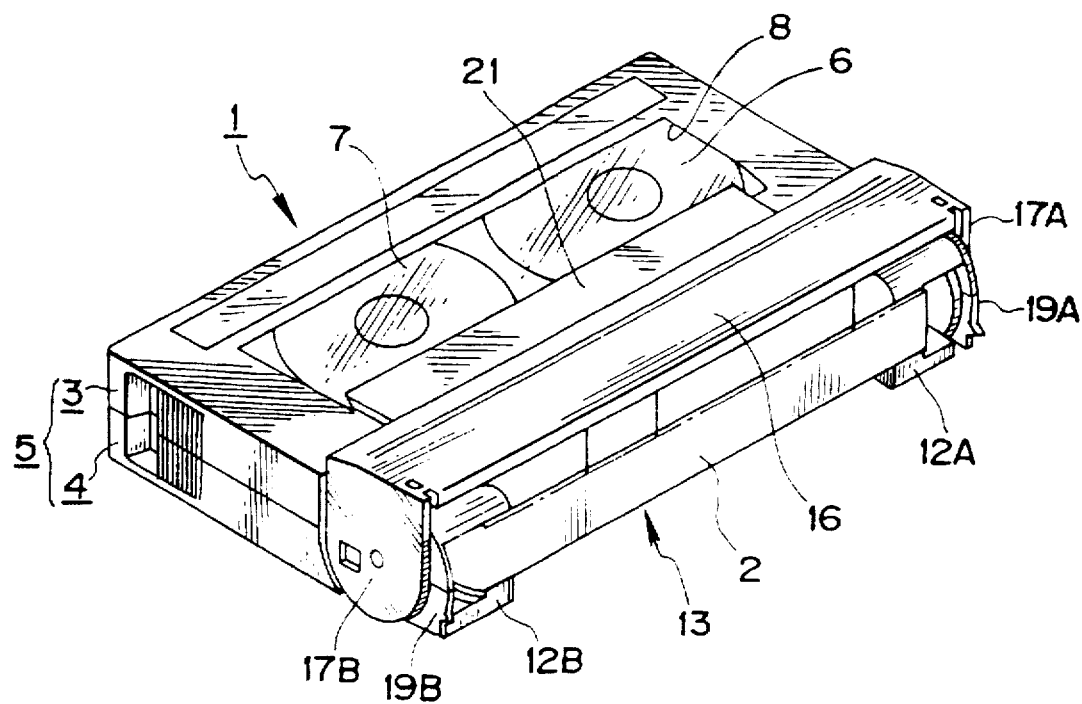
FIG. 2 is a perspective view of the tape cartridge showing the state in which a front lid rotatably mounted on the front surface has been rotated.

The tape cartridge 1 of the illustrated embodiment has housed therein a magnetic tape 2 having a tape width of 8 mm. The tape cartridge 1 is composed of a cartridge main body 5 made up of upper and lower cartridge halves 3, 4 connected to each other by plural set screws, as shown in FIGS. 1 and 2. The cartridge halves 3, 4 are substantially rectangular in shape and formed by molding a synthetic material. Within the cartridge main body 5 are rotatably housed a pair of tape reels, that is a tape supply reel 6 and a tape take-up reel 7. The magnetic tape 2 is placed around these reels 6 and 7 which are arranged in a side-by-side relation along the length of the cartridge main body 5.

Figure 4:
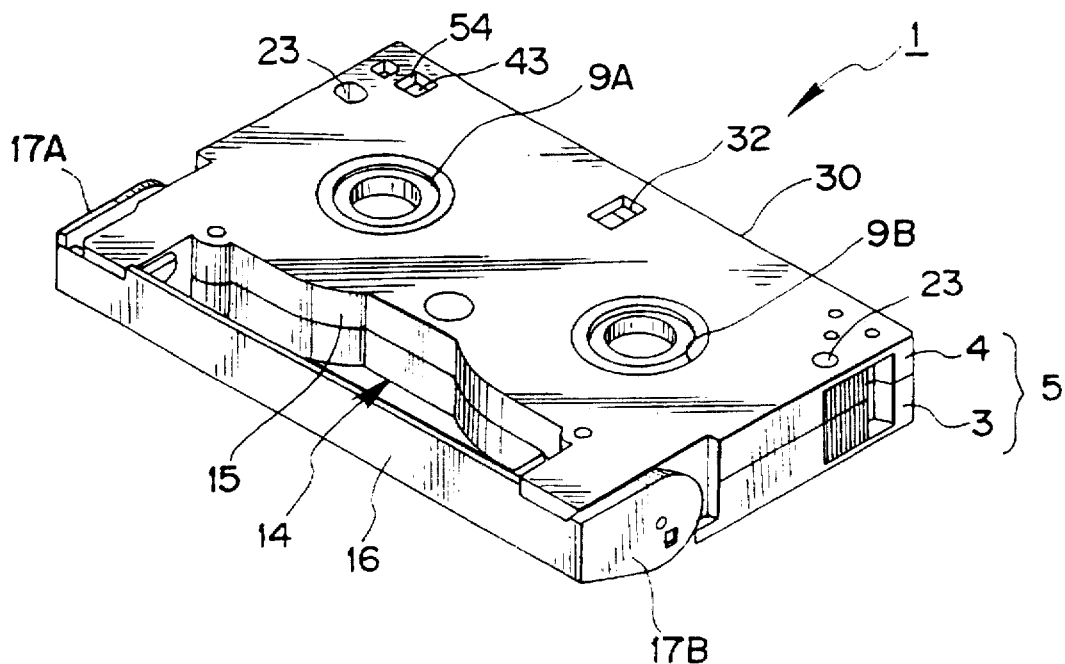
FIG. 4 is a perspective view looking from the bottom side of the tape cartridge.

A rectangular-shaped display window 8 is formed in a top surface of the upper cartridge half 3 constituting the upper surface of the cartridge main body 5, as shown in FIGS. 1 and 2. Thus the state of the magnetic tape 2, placed around the tape supply reel 6 and the tape take-up reel 7, housed within the cartridge main body 5, can be seen from outside. The lower cartridge half 4, constituting the lower surface of the cartridge main body 5, is formed with hub engagement holes 9A, 9B configured for causing portions of the hubs of the tape supply reel 6 and the tape take-up reel 7 to face outward and for limiting rotation of the tape supply reel 6 and the tape take-up reel 7, as shown in FIG. 4. The bottom surface of the lower cartridge half 4 is formed with a variety of discriminating holes, such as tape length discriminating holes for detecting the length of the magnetic tape 2 or a tape design statement discriminating holes for discriminating the sort of the magnetic tape 2.

Figure 5:
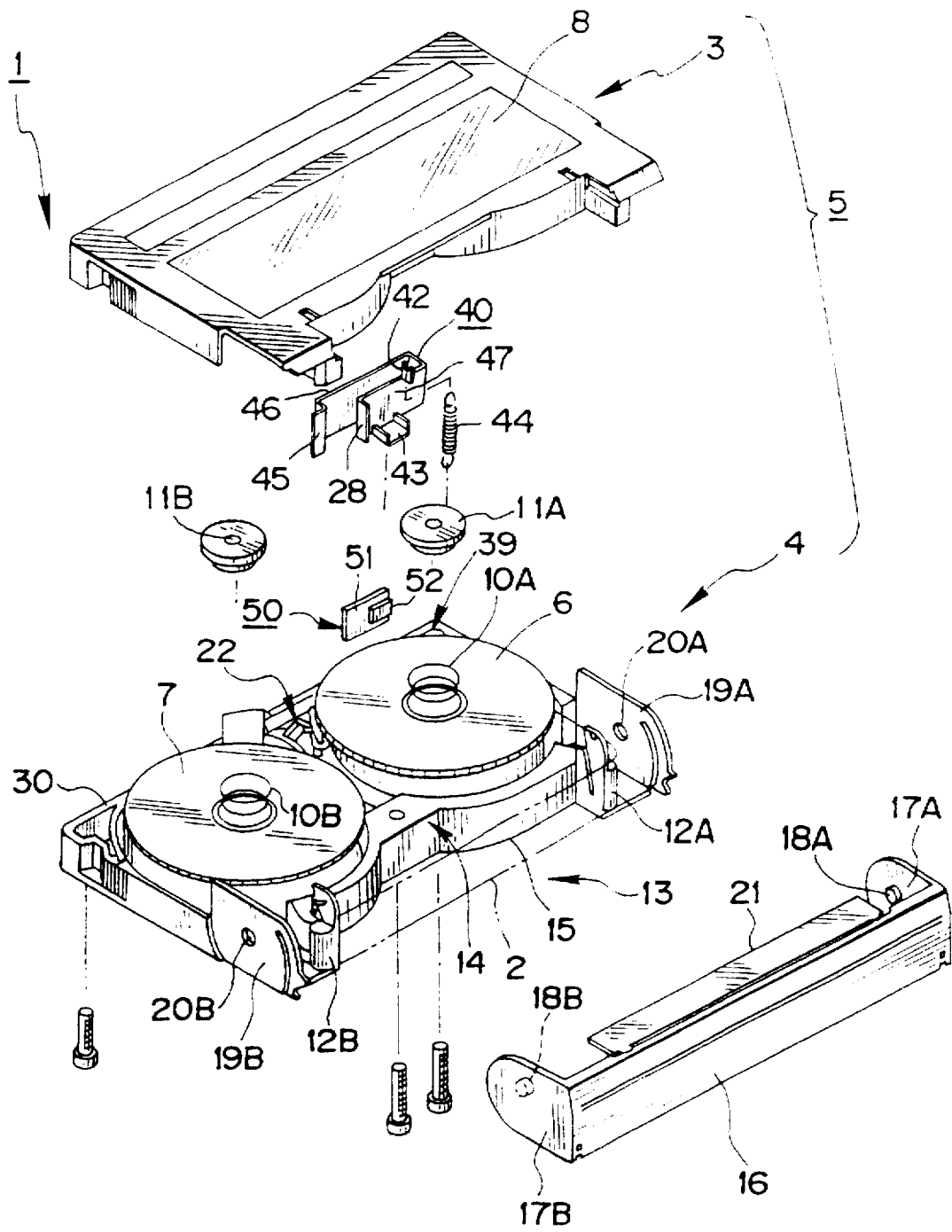
FIG. 5 is an exploded perspective view showing the inner mechanism of the tape cartridge.

The tape supply reel 6 and the tape take-up reel 7 are each constituted by a cylindrical hub around which the magnetic tape 2 is wound and a disc-shaped flange mounted on one side of the hub. The tape supply reel 6 and the tape take-up reel 7 are rotatably housed within the cartridge main body 5 by having their hubs engaged in the hub engagement holes 9A, 9B, respectively, as shown in FIG. 5. The tape supply reel 6 and the tape take-up reel 7 are carried in a manner free from vibrations within the cartridge main body 5 by having the center of rotation of each hub thrust against the lower cartridge half 4 by reel retention springs 10A, 10B and reel retention members 11A, 11B provided on the inner lateral surface of the upper cartridge half 3.

The magnetic tape 2 has its both ends secured by a clamper, not shown, by the hubs of the tape supply reel 6 and the tape take-up reel 7, so that the magnetic tape is reeled out from the tape supply reel 6 to outside of the cartridge main body 5 to travel along a front side 13 of the cartridge main body 5 by being guided by tape guides 12A, 12B formed integrally with the lower cartridge half 4 before being taken up on the tape take-up reel 7.

The cartridge main body 5 has its front side 13 opened substantially along its entire width and, in continuation to the front side 13, a tape lead-out recess 14 is formed into which a portion of the loading mechanism provided in the drive device is intruded. The cartridge main body 5 has a partition wall 15 for partitioning the inner space within which the tape supply reel 6 and the tape take-up reel 7 are rotatably housed from the tape lead-out recess 14.

A front lid 16 for closing the front surface 13 is rotatably mounted on the cartridge main body 5. The front lid 16 has a length substantially equal to the width of the cartridge main body 5, and is formed at both ends thereof with sidewall portions 17A, 17B facing each other and constituting fulcrum portions, so that the front lid in its entirety is substantially in the shape of a letter U. A pair of supporting shafts 18A, 18B are integrally formed on the inner sides of the sidewall portions 17A, 17B in axial alignment with each other.

On the side of the cartridge main body 5, both sidewall sections of the lower cartridge half 4 are protruded for surrounding the opened front side 13 for constituting fulcrum point portions 19A, 19B. These fulcrum point portions 19A, 19B are formed with axial openings 20A, 20B in register with the supporting shafts 18A, 18B of the front lid 16, respectively. The front lid 16 is rotatably mounted on the front side 13 of the cartridge main body 5 by having the supporting shafts 18A, 18B engaged in shaft openings 20A, 20B, respectively. The front lid 16 is rotationally biased in a direction of closing the opened front side of the cartridge main body 5 and closes the front surface 13 in the state of not being loaded on the drive unit, as shown in FIG. 1.

An upper lid member 21 closing the front open portion of the upper cartridge half 3 and a spring member, not shown, are assembled on the front lid 16. The upper lid member 21 is rotatably mounted on the inner surface of the front lid 16. When the front lid 16 is rotated as shown in FIG. 2 for opening the front side 13 of the cartridge main body 5, the upper lid member 21 is supported by the front lid 16 and is rotated so as to travel along the upper surface of the upper cartridge half 3. At this time, spring force is stored in the spring member, in a manner not shown in detail for affording the force of rotating the front lid 16 in a direction of closing the front side 13.

Although not shown in detail, an inner lid member is rotatably assembled to the front lid 16 for facing its inner major surface. The inner lid member is supported at a pre-set distance from the inner major surface of the front lid 16. The magnetic tape 2 is extended on the front side 13 of the cartridge main body 5 in a space thus defined between the inner lid member and the inner major surface. Thus the magnetic tape 2 is usually covered by the front lid 16 and the inner lid member and thereby protected against deposition of dust and dirt or external force. The inner lid member is rotated in association with the rotation of the front lid 16 for causing the magnetic tape 2 to face the front side 13 of the cartridge main body 5.

The tape cartridge 1 has a reel lock mechanism 22 for prohibiting the magnetic tape 2 placed around the tape reels 6, 7 from being relaxed with rotation of the tape supply reel 6 and the tape take-up reel 7 in an out-of-use state of the tape cartridge 1, as when the tape cartridge is stored without being loaded on the driving device. The reel lock mechanism 22 is arranged at the center on the rear side of the lower cartridge half 4, and includes a lock lever 34A engaged in an engagement tooth 37A formed on the outer periphery of a flange 36A of the tape supply reel 6, a lock lever 34B engaged in an engagement tooth 37B formed on the outer periphery of a flange 36B of the tape take-up reel 7, a reel unlock member 33 on the distal end of which the lock levers 34A, 34B are rotatably assembled, and a coil spring 35 for biasing the reel unlock member 33 towards the tape supply reel 6 and the tape take-up reel 7, as shown in FIG. 6.

The reel unlock member 33 is movably mounted in a slide spacing section delimited by parallel guide wall sections 31A, 31B set upright on the bottom surface of the lower cartridge half 4 between the tape supply reel 6 and the tape take-up reel 7, and is integrally formed with an operating section, not shown, exposed to outside via a through-hole 32 formed in the bottom surface of the lower cartridge half 4. When the tape cartridge 1 is loaded on the driving unit, an operating member 95 provided on the driving unit is passed through the through-hole 32 for moving the reel unlock member 33 towards the rear side of the cartridge main body 5 against the coil spring 35 so that the lock lever 34 is receded from engagement with the engagement tooth 37 of the tape supply reel 6 and the tape take-up reel 7, the reel lock mechanism 22 then unlocking the tape supply reel 6 and the tape take-up reel 7.

The tape cartridge 1 of the instant embodiment has enclosed therein an auxiliary memory unit 50, as shown in FIG. 5. The memory unit 50 comprises a memory IC which is a storage element for recording the contents of information signals recorded on the magnetic tape 2, design statements of the magnetic tape or the like, or identification information such as use states. The identification information recorded on the memory IC of the auxiliary memory unit 50 is read by an auxiliary recording/reproducing unit provided in the drive unit via a connector as later explained, or a separate auxiliary recording/reproducing unit, while the updated identification information is recorded in the memory IC 52. This auxiliary memory unit 50 is made up at least of a wiring substrate 51, the memory IC 52 installed on the wiring substrate 51 and plural contact terminals 53 printed on the wiring substrate 51 and operating as input/output terminals of the memory IC 52. The wiring substrate 51 is constituted as a so-called double-sided substrate. In the state in which the substrate 51 is assembled on the cartridge main body 5, as explained subsequently, the memory IC 52 and the contact terminals 53 are mounted on the inwardly and outwardly facing major surfaces of the substrate 51, respectively.

Figure 3:
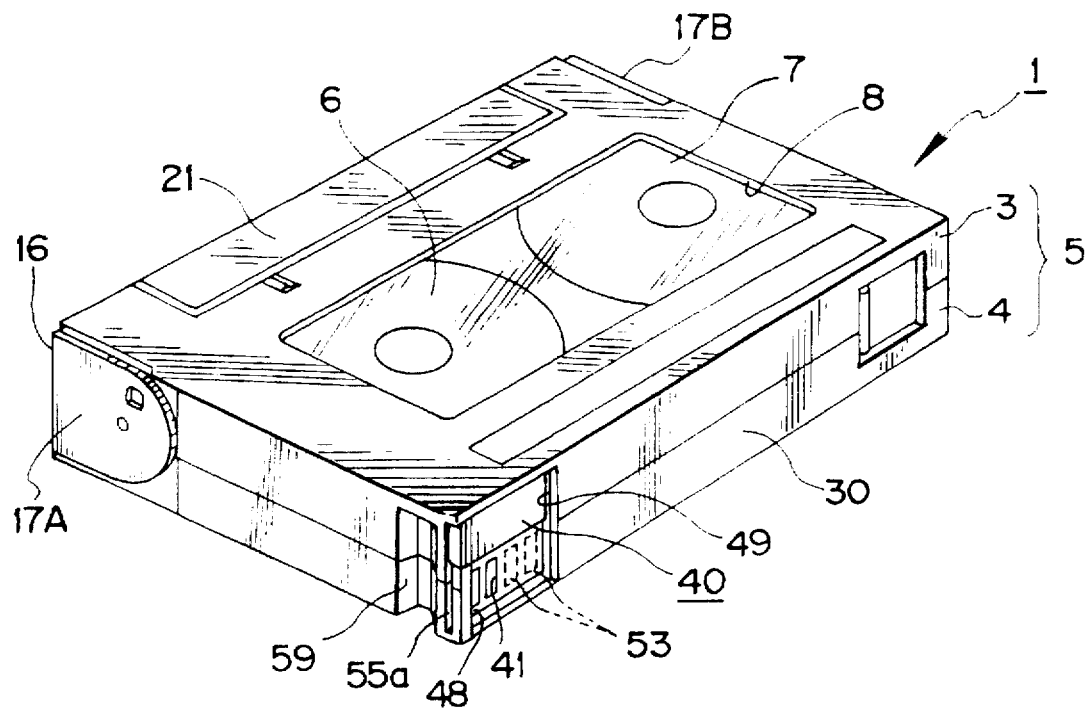
FIG. 3 is a perspective view looking from the back side of the tape cartridge.
Figure 6:
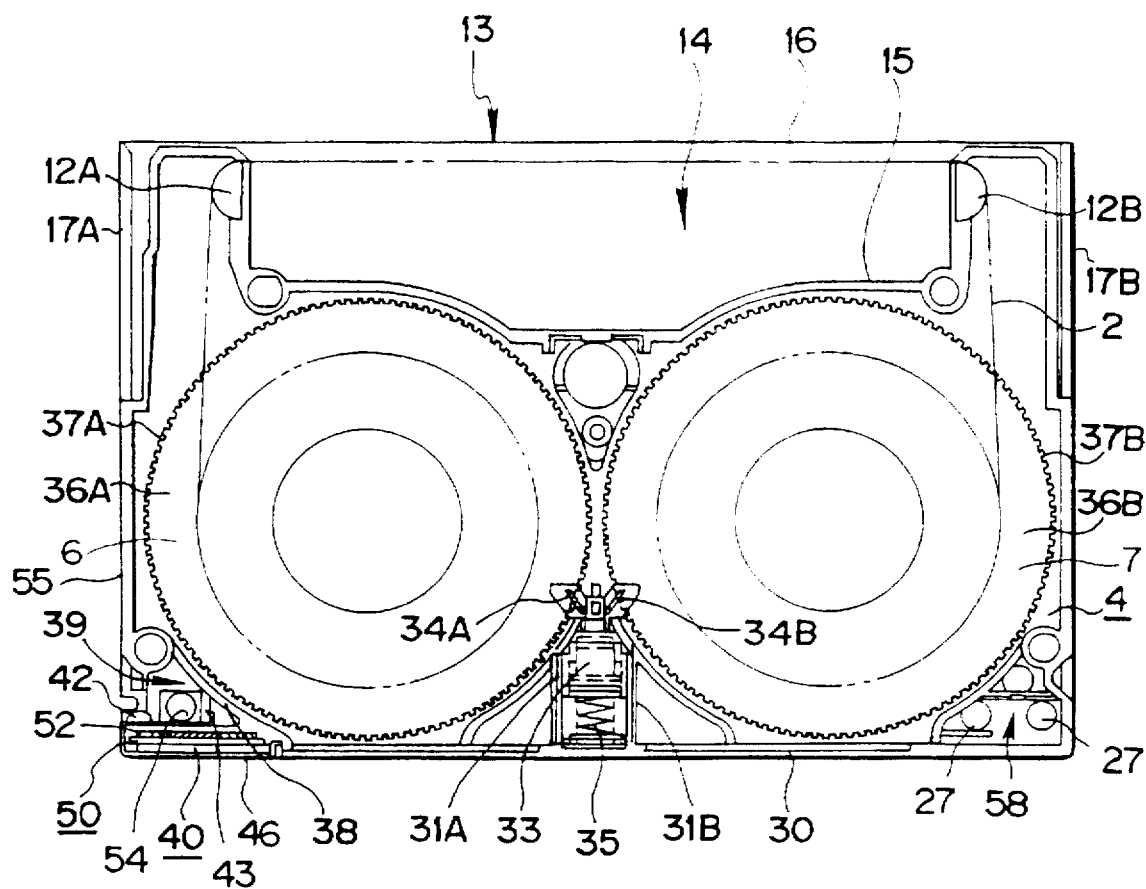
FIG. 6 is a plan view of the tape cartridge showing its inner mechanism with its upper half being removed.

The contact terminals 53 of the auxiliary memory unit 50 are exposed to outside via contact openings 41 formed in a rear wall section 30 of the upstanding peripheral wall section of the cartridge main body 5, at a corner 39 on the rear side of the cartridge main body 5, as shown in FIGS. 3, 5 and 6. That is, the cartridge main body 5 is provided at each rear side corner with a substantially triangular spacing delimited by the upstanding peripheral wall section of the cartridge main body 5 and reel guide wall section 38 formed upright on the bottom surfaces of the upper cartridge half 3 and the lower cartridge half 4 for surrounding the outer periphery of the flanges 36 of the tape supply reel 6 and the tape take-up reel 7, as shown in FIG. 6.

Figure 7:
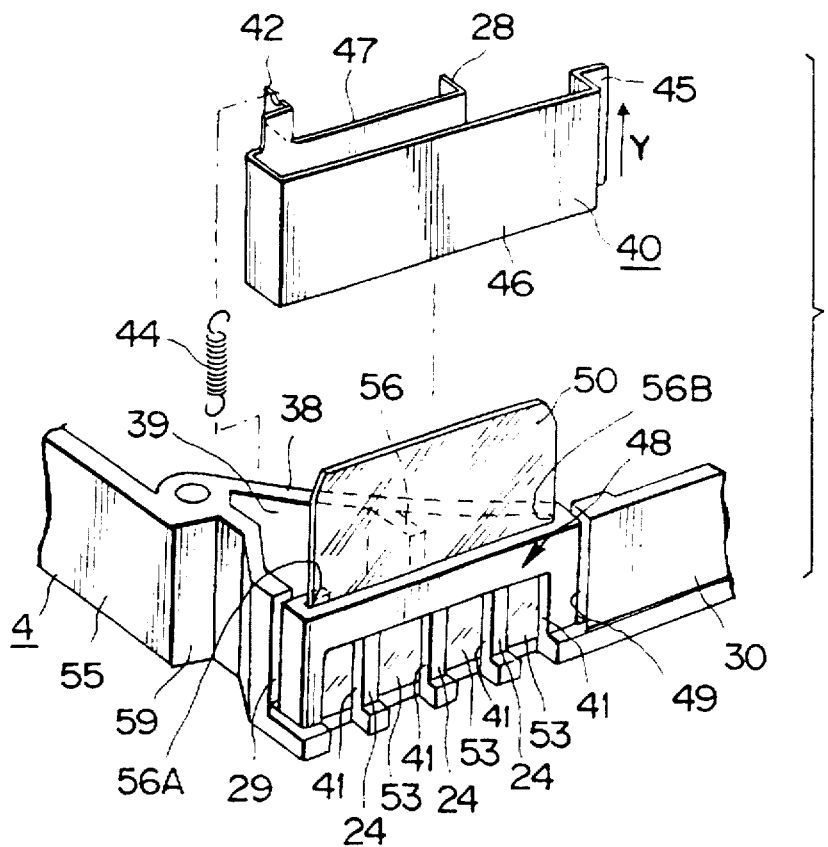
FIG. 7 is an exploded perspective view showing a shutter member and a portion of the cartridge main body carrying the shutter member.

The confronting inner lateral sides of the reel guide wall section 38 and a sidewall section 55 of the upstanding peripheral wall section of the cartridge main body 5 within the spacing 39 at one of the corners of the cartridge main body 5 are formed with insertion grooves 56A, 56B extending along the height of the cartridge main body 5, as shown in FIGS. 6 and 7. Within a spacing 58 on the opposite side corner of the cartridge main body 5 are a variety of discriminating holes 27, such as formed a tape length detection hole for detecting the length of the magnetic tape 2 or the tape design statement identification holes for discriminating the sorts of the magnetic tape 2.

The contact openings 41 are formed in the rear wall section 30 of the cartridge main body 5 constituting the spacing 39 at the corner thereof as rectangular openings sized to permit the contact terminals 53 of the auxiliary memory unit 50 to face to the outside. The contact openings 41 are separated from one another by partitions for permitting the contact terminals 53 to face separately to outside of the cartridge main body 5. The auxiliary memory unit 50 is assembled in the cartridge main body 5 by having both lateral edges of the wiring substrate 51 thereof engaged into the inserting grooves 56A, 56B so that the memory IC is disposed inward and the contact terminals 53 are caused to face to outside via the contact openings 41.

A shutter member 40 is mounted on the cartridge main member 5 for closing the contact openings 41 designed for exposing the contact terminals 53 to outside. The shutter member 40 has a rectangular shutter section 46 sized and shaped to close the contact openings 41, a slide guide piece 47 bent from an end of the shutter section 46 parallel to the shutter section 46 and a thrust piece 43 protruded from the lower lateral side of the slide guide piece 47, as shown in FIG. 7. The shutter member 40 is mounted on the cartridge main member 5, with the shutter section 46 extending along the outer lateral surface of the rear wall section 30 of the cartridge main body 30 of the cartridge main body 5 for closing the contact openings 41, with the slide guide piece 47 being introduced into an inserting groove 29 formed in the lateral wall section 55 of the cartridge main body 5 for extending into the cartridge main body 5, and with the shutter section 46 and the slide guide piece 47 sandwiching the portion of the rear wall section 30 of the cartridge main body 5 formed with the contact openings 41 and the auxiliary memory unit 50. The shutter member 40 is mounted at this time in the cartridge main body 5 with a bent portion 45 on one end of the shutter section 46 engaging in an engagement groove 49 formed in an upstanding portion on one side of a slide guide recess 48 formed in the outer peripheral surface of the rear wall section 30 of the cartridge main body 5 and with an engagement piece 28 formed by bending an end of the slide guide piece 47 engaging in a retention piece 56 provided in the cartridge main body 5, as shown in FIGS. 6 and 7. The retention piece 57, engaged with the engagement piece 28 provided on the slide guide piece 47, is formed for extending into the spacing 39 from the outer peripheral surface of the reel guide wall section 38.

Since the shutter member 40 is mounted on the cartridge main body 5 by having the bent portion 45 on one end of the shutter section 46 and the engagement piece 28 on one end of the slide guide piece 47 engaged with portions of the cartridge main body 5, as described above, the shutter member is movable rectilinearly without being wobbled along the height of the cartridge main body 5.

Figure 8:
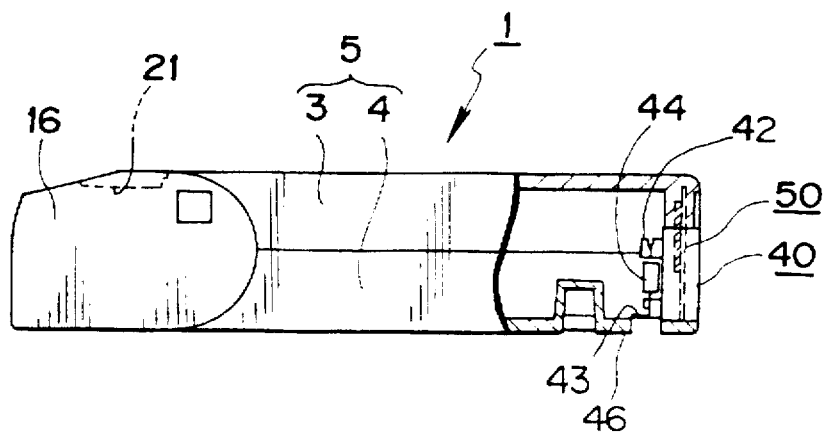
FIG. 8 is a cross-sectional side view showing the state in which the shutter member is mounted within the cartridge main body.

The upper end of the slide guide piece 47 of the shutter member 40 is formed with a spring retainer 42, and a coil spring 44 is installed in an extended state between the spring retainer and the bottom surface of the lower cartridge half 4, as shown in FIG. 8. The shutter member 40 is mounted within the cartridge main body 5 as it is biased by the coil spring 44 in a direction of closing the contact openings 41 by the shutter section 46 as indicated by arrow X in FIG. 7.

The bottom surface of the lower cartridge half 4 of the cartridge main body 5 is formed with a rectangular through-hole 54 for facing the thrust piece 43 of the shutter member 40, as shown in FIG. 4. Into this through-hole 54 is intruded a shutter thrusting member 96 provided on the recording and/or reproducing apparatus. The shutter member 40 is moved in the direction shown by arrow Y in FIGS. 3 and 8, against the bias of the coil spring 44, by the shutter thrusting member 96 intruding into the cartridge main body 5 via the through-hole 54 for thrusting the thrust piece 43. This opens the contact openings 41, so far closed by the shutter member 40, for permitting the contact terminals 53 to face to outside of the cartridge main body 5 via these contact openings 41.

On both sides of the back surface of the cartridge main body 5 are formed positioning grooves 59 for extending vertically across the upper cartridge half 4 and the lower cartridge half 3 for being opened on the bottom surface of the lower cartridge half 4. Although not shown, the positioning grooves 59 are flared slightly at the opening end on the lower cartridge half 4 for permitting smooth fitting with positioning members of the drive unit.

The above-described tape cartridge 1 is loaded on the recording and/or reproducing apparatus for permitting the operation of opening of the front lid 16 covering the front side of the cartridge main body 5 and the operation of unlocking the tape supply reel 6 and the tape take-up reel 7, so far locked by the reel lock mechanism 22, while permitting the shutter member 40 to be moved against the bias of the coil spring 44 for exposing the contact terminals 53 to outside of the cartridge main body 5.

An illustrative example of a cartridge loading unit of a drive unit, employing an external memory of an information processor, in which the tape cartridge 1 of the instant embodiment is used as a recording medium, is hereinafter explained.

Figure 9:
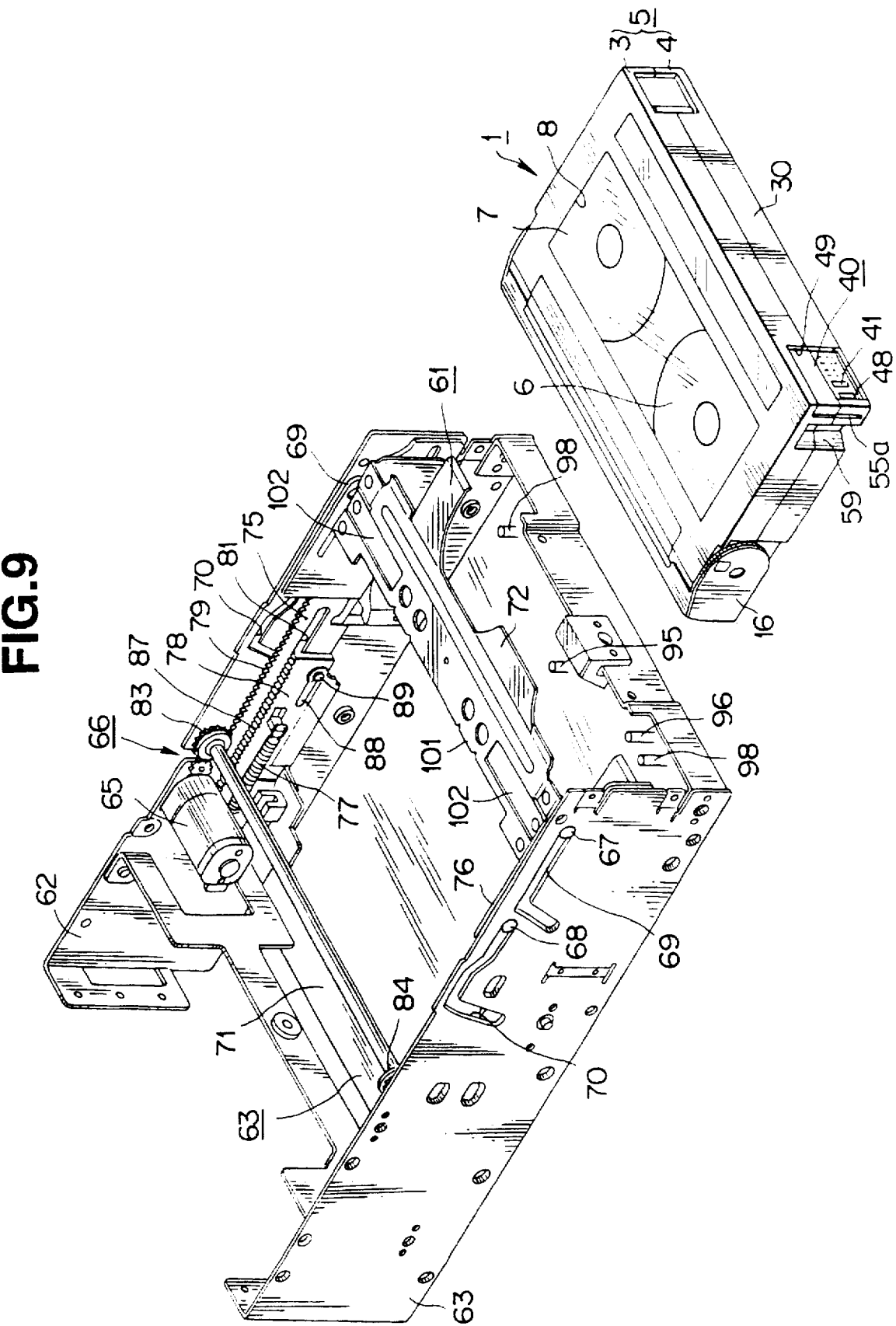
FIG. 9 is a perspective view showing a cartridge loading device for loading the tape cartridge according to the present invention on a cartridge loading unit of the driving device.
Figure 10:
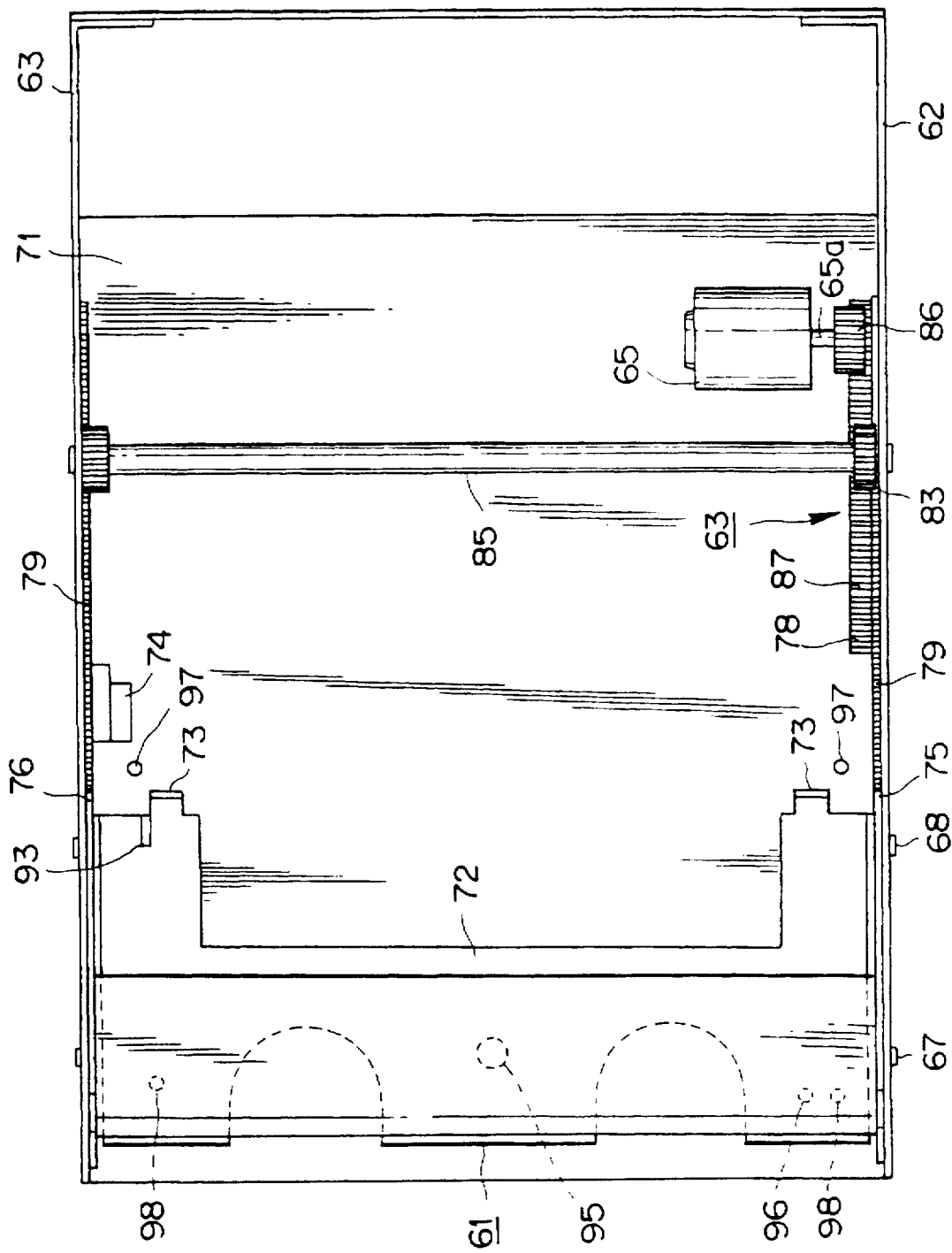
FIG. 10 is a plan view of the cartridge loading device.

The cartridge loading unit includes a cartridge holder 61 for holding the tape cartridge 1 inserted therein and a chassis 64 having a pair of side plates 62, 63 for supporting the cartridge holder 61 for movement between the cartridge unloading position and the cartridge loading position, as shown in FIGS. 9 and 10. The cartridge loading unit also includes a holder shifting mechanism 66 having a driving motor 65 for shifting the cartridge holder 61 between the cartridge unloading position and the cartridge loading position.

The cartridge holder 61 has two pairs of slide guide pins 67, 68 on the outer sides of its confronting lateral wall sections. The cartridge holder 61 is arranged between the side plates 62 and 63 by having these slide guide pins 67, 68 inserted into and supported by slide guide grooves 69, 70 formed in the side plates 62, 63 formed upright on both lateral sides of the chassis 64. The cartridge holder 61 is shifted between the cartridge unloading position and the cartridge loading position, with the slide guide pins 67, 68 being guided along the slide guide grooves 69, 70.

Figure 11:
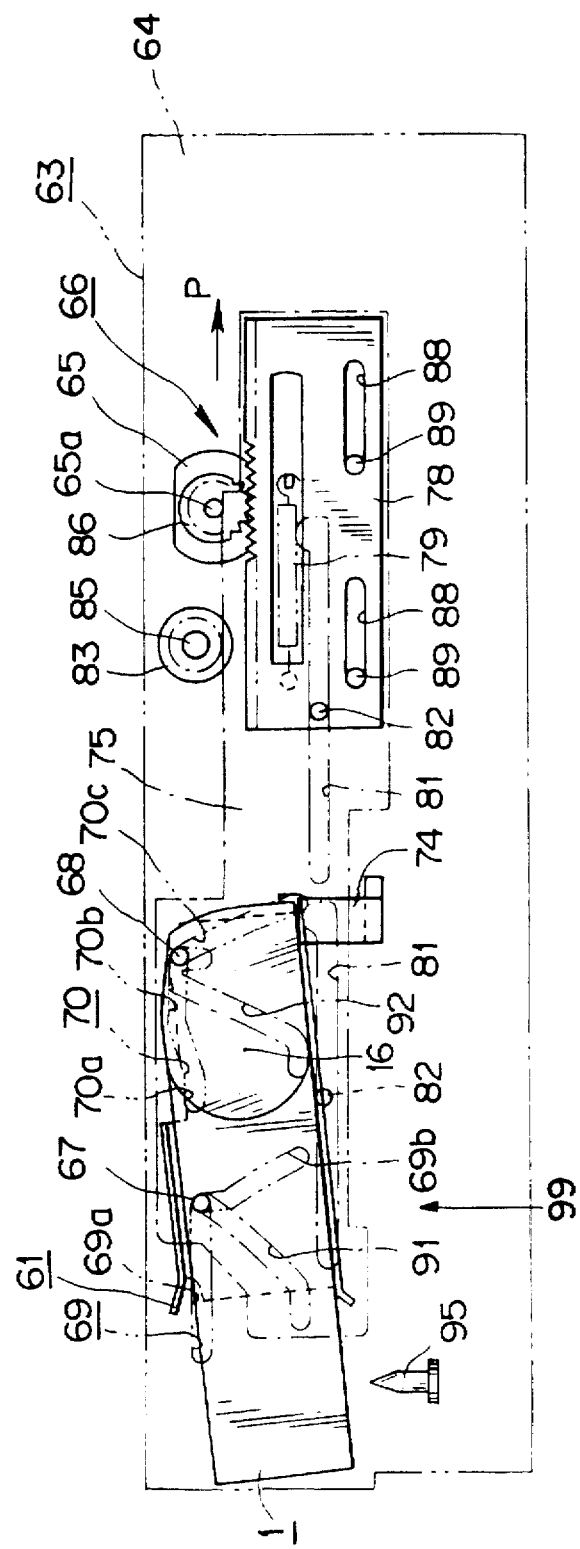
FIG. 11 is a side view of the cartridge loading device showing an initial operating state in which the tape cartridge has been inserted into and held by the cartridge holder and the cartridge holder is intruded towards the cartridge loading position.

The slide guide groove 69 towards the outer side of the main body of the apparatus has a horizontal guide groove section 69a and an inclined guide groove section 69b inclined towards a cartridge loading section 99 formed on the bottom plate 71 of the chassis 64, in this order, as shown in FIG. 11. On the other hand, the slide guide groove 70 towards the inner side of the main body of the apparatus has an inclined guide groove section 70a inclined upwards from the bottom plate 71 of the chassis 64, a horizontal guide groove section 70b and an inclined guide groove section 70c inclined towards the cartridge loading section 99, in this order, as shown in FIG. 11. The cartridge holder 61, thus shifted from the cartridge unloading position towards the cartridge loadable position under guidance by the slide guide grooves 69, 70, is shifted in such a manner that its forward end is transiently rotated upwards about the slide guide pin 67 inserted into the slide guide groove 69 as the center of rotation and the cartridge holder 61 is then restored to its horizontal position with respect to the bottom plate 71 of the chassis 64 before being allowed to descend towards the bottom plate 71 of the chassis 64.

On both sides of the forward end portion, that is the end portion of insertion of the disc cartridge 1 of the bottom plate 72 of the cartridge holder 61, there are formed abutting pieces 73, 73 configured for abutting against the front side of the disc cartridge 1 inserted in the cartridge holder 61 for delimiting the inserting position of the disc cartridge 1. The side of the bottom plate 72 of the cartridge holder 61 provided with the abutting piece 73 is formed with an upstanding lid unlock piece 74 configured for rotating a lock lever locking the front lid 16 of the tape cartridge 1 inserted into and held by the cartridge holder 61 for unlocking the front lid 16.

The holder shift mechanism 66 includes a pair of slide plates 75, 76 arranged on the inner lateral sides of the side plates 62, 63 and a limiting plate 78 connected to the slide plate 75 via a limiting spring 77. The slide plates 75, 76 are formed with rack gears 79, 79 on the upper edges thereof for extending in the longitudinal direction, and with elongated openings 81, 81 extending in the longitudinal direction. The slide plates are supported for movement within the extent of the elongated openings 81 by having supporting pins 82, 82 formed upright on the side plates 62, 63 passed through the openings 81, 81. The slide plates 75, 76 are interconnected by a drive power transmission shaft 85 so as to be slid in the same direction in timed relation to each other. To this end, the drive power transmission shaft 85 has gears 83, 84 mounted on its opposite ends for being engaged with the rack gears 79, 79. The upper edge of the limiting plate 78 is also formed with a rack gear 79 engaged by a driving gear 86 mounted on an output shaft 65a of the driving motor 65 mounted via the side plate 62.

The limiting plate 78, connected to the slide plate 75 via the limiting spring 77, has an elongated opening 88 having its long axis extending in its longitudinal direction.

The limiting plate 78 is supported by having a supporting pin 89 formed upright on the slide plate 75 inserted into the elongated opening 88 so that the limiting plate is movable within the extent of the elongated opening 88 with respect to the slide plate 76. Thus, should an excess load be applied to the limiting plate 78, the limiting spring 77 is extended for accommodating the movement of the limiting plate 78 for absorbing excess load.

A pair of cam grooves 91, 92 are formed in the slides 75, 76. In these can groves 91, 92 are inserted slide guide pins 67, 68 of the cartridge holder 61 inserted into and supported by the slide guide grooves 69, 70 formed in the side plates 62, 63, respectively. These cam grooves 91, 92 perform the role of controlling the direction of movement of the slide guide pins 67, 68 so that the slide guide pins 67, 68 will be moved along the slide guide groves 69, 70, respectively.

On the inner lateral side of the opposite side plate 63 is mounted a lid opening member 93 for rotating the front lid 16 of the tape cartridge 1 in the course of descent from the cartridge loading position towards the cartridge loading section 99 against the bias of the biasing member, for opening the front surface 13 of the cartridge main body 5.

On the bottom plate 71 of the chassis 64 is mounted an actuating member 95 for unlocking the tape supply reel 6 and the tape take-up reel 7 loaded on the cartridge loading section 99. When the tape cartridge 1 is loaded on the cartridge loading section 99, the actuating member 95 is passed through the through-hole 32 formed in the bottom of the cartridge main body 5 for moving the reel unlock member 33 towards the back side of the cartridge main body 5 against the bias of the cartridge main body 5. By such movement towards the back side of the reel unlock member 33, the distal ends of the lock levers 34A, 34B are rotated in a direction away from the tape supply reel 6 and the tape take-up reel 7 for unlocking and permitting rotation of the reels 6, 7.

A shutter thrusting member 96 is provided on the bottom plate 71 of the chassis 64 for being intruded into the through-hole 32 faced by the thrust piece 43 of the shutter member 40 provided on the bottom surface of the tape cartridge 1 loaded on the cartridge loading section 99. When the tape cartridge 1 is loaded on the cartridge loading section 99, the shutter thrusting member 96 is passed through the through-hole 32 so as to be intruded into the cartridge main body 5 for thrusting the thrust piece 43 for moving the shutter member 40 against the bias of the coil spring 44. The contact openings 41, so far closed by the shutter member 40, are now opened so that the contact terminals 53 face to the outside of the cartridge main body 5.

On the bottom plate 71 of the chassis 64, there are formed upright a pair of vertical positioning pins 97, 97 supporting the bottom surface of the tape cartridge 1 loaded on the cartridge loading section 99, while there are also formed a pair of positioning pins 98, 98 engaged in the positioning openings 23, 24 bored in the bottom surface of the tape cartridge 1.

On the bottom surface 71 of the chassis 64, there is also formed a connection terminal mechanism, not shown, electrically connected to the contact terminals 53 of the tape cartridge 1.

For loading the tape cartridge 1 on the cartridge loading section 99 of the drive unit with the aid of the above-described cartridge loading unit, the tape cartridge 1 is first introduced into the cartridge holder 61, with the front lid 16 as the inserting end, as shown in FIG. 9. The tape cartridge 1 is inserted at this time until its front end is abutted against the abutting pieces 73, 73. The tape cartridge 1 is held with a pre-set inserting position thereof with respect to the cartridge holder 61. At this time, the tape cartridge 1 is thrust and supported by a plate spring 102 provided on a top plate 101 of the cartridge holder 61.

When the tape cartridge 1 is inserted into the cartridge holder 61, the front lid 16 is unlocked by the lid unlock piece 74. The front lid 16 may now be opened against the bias of a biasing member.

When a detecting mechanism detects that the tape cartridge 1 has been inserted into and held by the cartridge holder 61, the driving motor 65 starts to be rotated in the forward direction. The driving power of the driving motor 65 is transmitted to the limiting plate 78 engaged by the driving gear 86. Since the limiting plate 78 is connected by the limiting spring 77 to the slide plate 76, the slide plate 76 is slid towards the inside of the main body of the apparatus as indicated by arrow P in FIG. 11 in unison with the limiting plate 78. The opposite side slide plate 75, connected to the slide plate 76 by the transmission shaft 85, is also slid in a timed relation in a direction indicated by arrow P in FIG. 11.

When the slide plates 75, 76 are slid in the direction indicated by arrow P in FIG. 11, the cartridge holder 61 is moved in the same direction by being guided by the slide guide pins 67, 68 and the slide guide grooves 69, 70.

When the cartridge holder 61 is moved in the direction indicated by arrow P in FIG. 11, the opposite side slide guide pin 68 is moved along the cam groove 92 formed in the side plate 63 and is moved upwards by being guided along the inclined cam groove 70a of the opposite side slide guide groove 70. At this time, the slide guide pin 67 is positioned in the horizontal guide groove 69a of the slide guide groove 69 for being moved horizontally. Thus the cartridge holder 61 is swung so that its forward end is uplifted about the slide guide pin 67 as the center.

Figure 12:
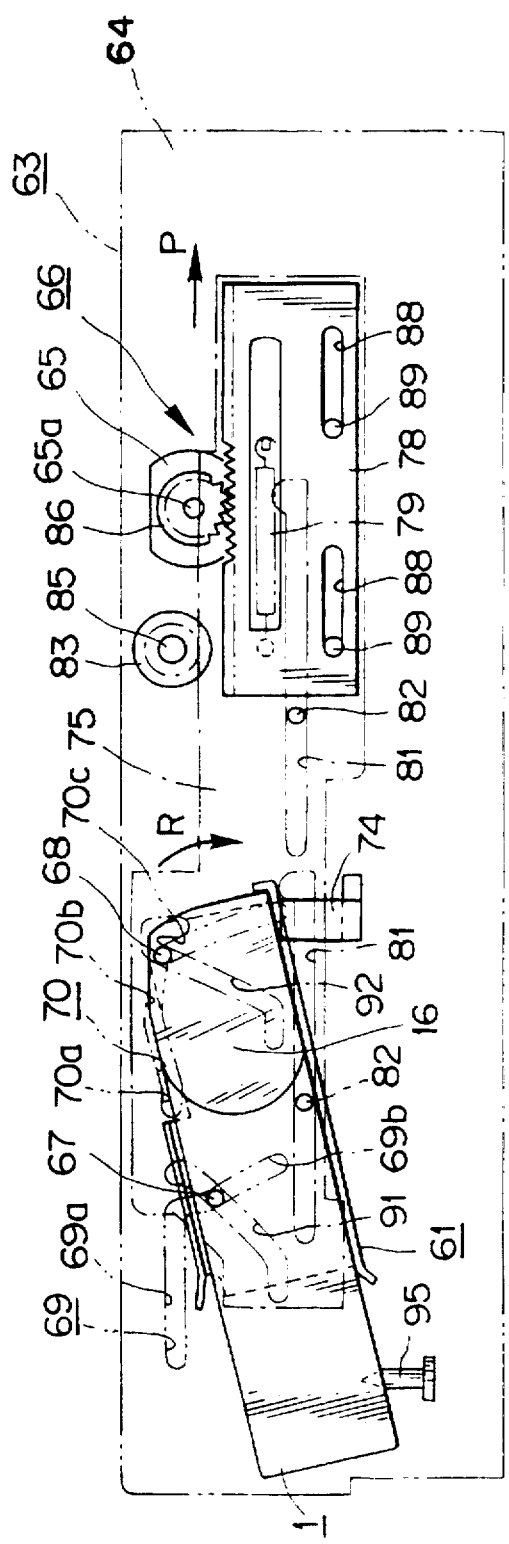
FIG. 12 is a side view of the cartridge loading device showing the state in which the cartridge holder is moved towards the cartridge loading position and is in an inclined state.

As the driving motor 65 is further driven in rotation and the slide plates 75, 76 are slid in the direction shown by arrow P in FIG. 11, the slide guide pin 67 inserted into the slide guide groove 69 reaches the inclined guide groove 69b from the horizontal guide groove 69a as shown in FIG. 12. The slide guide pin 67 is further moved by the cam groove 91 formed in the side plate 63 and descends towards the bottom plate 71 of the chassis 64 by being guided by the inclined cam groove 69b. Since the opposite side slide guide pin 67 is positioned at this time in a range from the horizontal guide groove 70b as far as the inclined guide groove 70a, the cartridge holder 61 is swung about the opposite side slide guide pin 67 so that the rear end of the cartridge holder is lowered.

Figure 13:
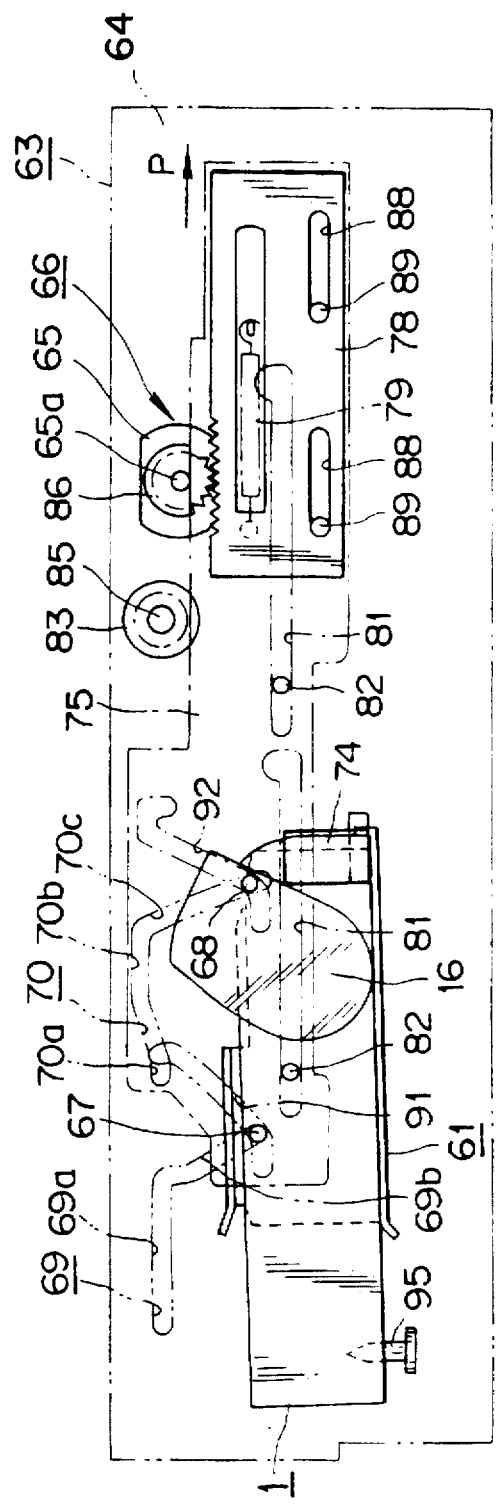
FIG. 13 is a side view showing the state in which the tape cartridge has been loaded on the cartridge loading unit in a substantially horizontal state.

If the driving motor 65 is driven from the state shown in FIG. 12, and the slide plates 75, 76 are slid in a direction shown by arrow P in FIG. 12, the slide guide pins 67, 68 are moved by the cam grooves 91, 92 as shown in FIG. 13, so as to descend towards the bottom pate 71 of the chassis 64 by being guided by the downwardly inclined guide grooves 69b, 70c of the inclined guide grooves 69, 70. Since the cartridge holder 61 descends at this time beginning from the state in which its forward end is inclined upwardly, as shown in FIG. 12, the cartridge holder 61 descends so as to be rotated in a direction of arrow R in FIG. 12 with the opposite side slide guide pin 67 as the center.

As the cartridge holder 61 descends as it is rotated in the direction of arrow R in FIG. 12, the lower edge of the font lid 16 of the tape cartridge 1 is abutted against the lid opening member 93. As the cartridge holder 61 descends, the front lid 16 is thrust by the lid opening member 93 and rotated against the bias of the biasing member for opening the front surface 13 of the cartridge main body 5. Since the tape cartridge 1 descends as it is rotated with respect to the lid opening member 93, the front lid 16, rotatably mounted via the stationary lid opening member 93 on the cartridge main body 5, may be rotated reliably.

Figure 15:
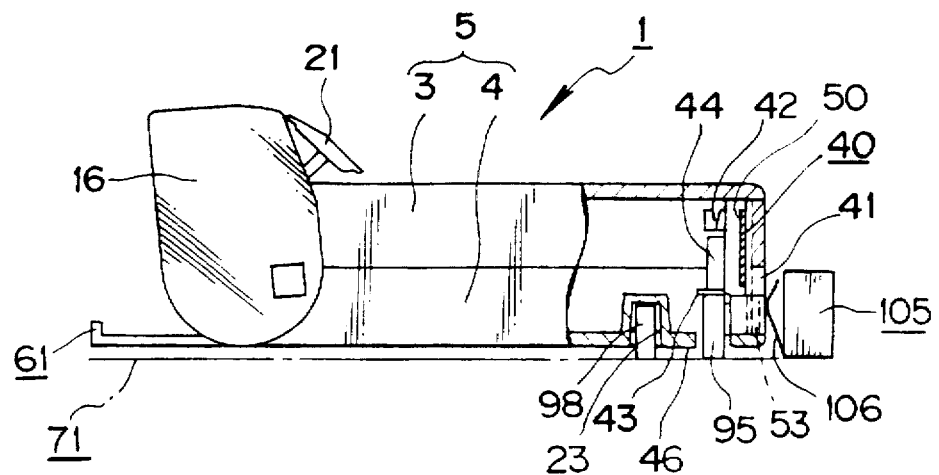
FIG. 15 is a cross-sectional side view showing the state in which the tape cartridge has been loaded on the cartridge loading unit and connection terminals have been contacted with the contact terminals.
Figure 16:
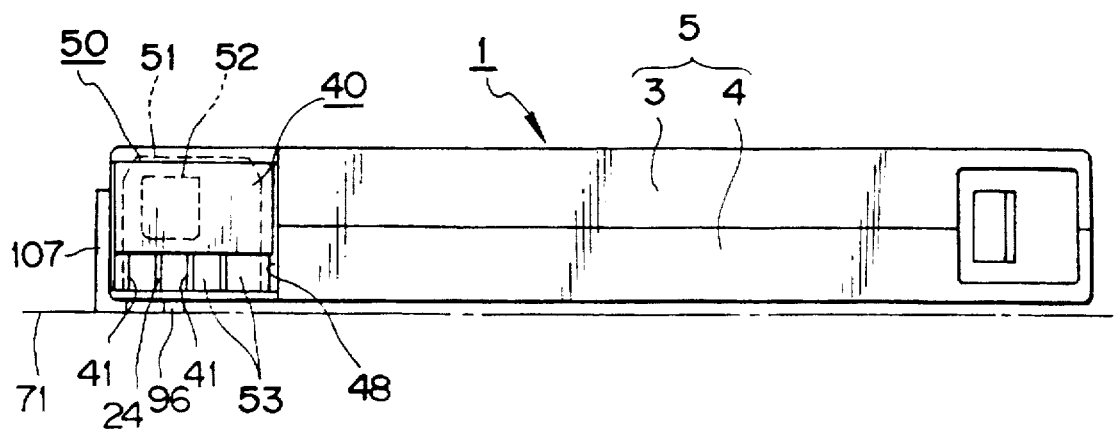
FIG. 16 is a back side view showing the state in which the tape cartridge has been loaded on the cartridge loading unit and in which the contact terminals are caused to face outwardly of the cartridge main body.

As the cartridge holder 61 descends as it is rotated in the direction of arrow R in FIG. 12, the reel unlock member 33 is intruded into the through-hole 32 formed in the bottom surface of the tape cartridge 1, as shown in FIG. 13. Thus the tape supply reel 6 and the tape take-up reel 7, so far locked by the reel lock mechanism 22, are unlocked, so that the tape supply reel 6 and the tape take-up reel 7 are now able to be rotated. The shutter thrusting member 96 is also intruded into the through-hole 32, as shown in FIGS. 15 and 16, for thrusting the thrust piece 43, for shifting the shutter member 40 against the bias of the coil spring 44 for opening the contact openings 41 so far closed by the shutter member 40 for causing the contact terminals 53 to face to the outside of the cartridge main body 5.

Figure 14:
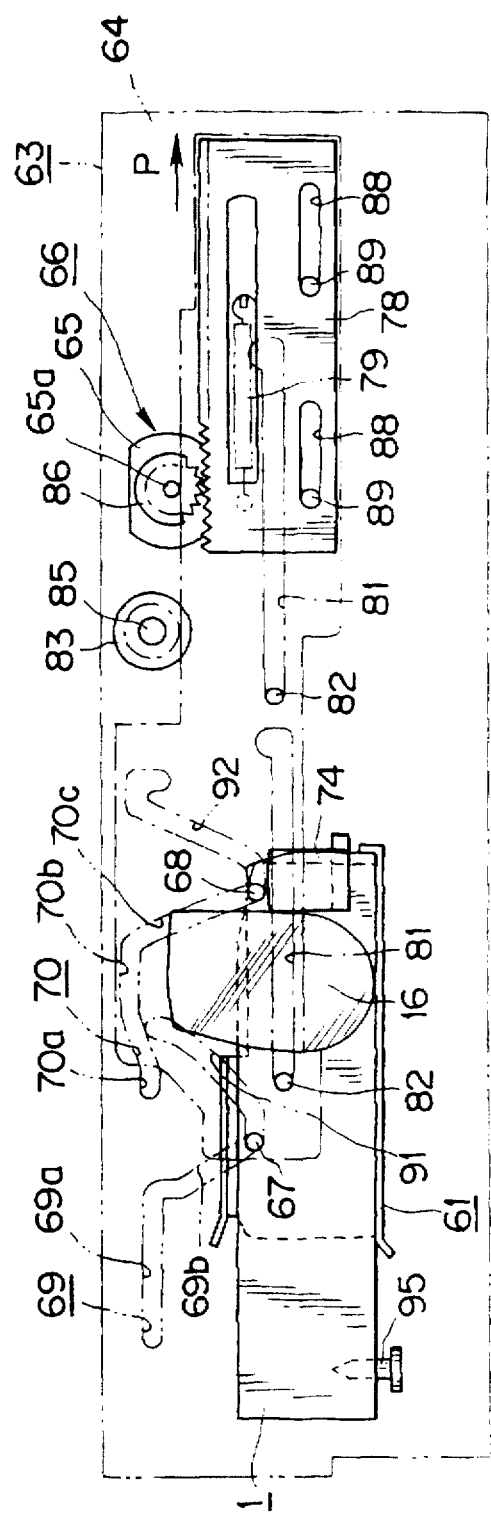
FIG. 14 is a side view showing the state in which the tape cartridge has been loaded on the cartridge loading unit.

When the driving motor 65 is further driven in the forward direction from the state shown in FIG. 13, and the slide plates 75, 76 are slid in the direction of arrow P in FIG. 13, the cartridge holder 61 descends to the lower most position, as indicated in FIG. 14. The tape cartridge 1 is supported in position by the height setting pins 97, 97 and the positioning pins 98, 98 and loaded in this state on the cartridge loading section 99. At this time, the thrust piece 43 of the shutter member 40 remains supported by the shutter thrusting member 96. The shutter member 40 thus opens the contact openings 41 for maintaining the contact terminals 53 in the state of being exposed to outside of the cartridge main body 5, as shown in FIGS. 15 and 16.

When the cartridge holder 61 descends to the cartridge loading section 99, the front lid 16 of the tape cartridge 1 is turned to the position of completely opening the front surface 13 of the cartridge main body 5 by the lid opening member 93. When the tape cartridge 1 is loaded on the cartridge loading section 99 of the drive unit, the loading mechanism provided on the drive unit is intruded into the tape lead-out portion 14 for leading out the magnetic tape 2 out of the cartridge main body 5 for routing the tape on a pre-set tape running path.

When the cartridge holder 61 descends as far as the cartridge loading section 99 and the shutter member 40 is moved to the open position of exposing the contact terminals 53 to outside the cartridge main body 5, a connecting terminal 106 of the connecting terminal mechanism 105 arranged within the drive unit is introduced as it is flexed via the contact opening 41 into contact with the connecting terminal 53 of the auxiliary memory unit 50.

The connection terminal mechanism 105, adapted for contacting the contact terminal 53 with the connection terminal 106, is arranged on the bottom plate 71 of the chassis 64. This connection terminal mechanism 105 is connected to an auxiliary recording/reproducing apparatus arranged on the side of the driving unit adapted for reading out the discrimination information stored in the memory IC 52 and for writing the updated discrimination information in the memory IC 52. Thus, when the tape cartridge 1 is loaded on the cartridge loading section 99 and the contact terminal 53 is contacted with the connection terminal 106, the memory IC 52 is electrically connected to the auxiliary recording/reproducing unit. The auxiliary recording/reproducing unit then reads out the identification information stored in the memory IC 52 or writes the updated information in the memory IC 52.

The connection terminal 106 is formed by an electrically conductive flexible metal plate of e.g., phosphorus bronze and has a convexed mid portion. Thus the connection terminal 106 is intruded into the contact opening 41 as its convexed mid portion is resiliently deformed. As the connection terminal is intruded into the contact opening 41, the connection terminal is resiliently restored into its original shape so as to be contacted with the contact terminal 53.

The cartridge loading section 99 may be provided with a positioning member 107 engaged with the positioning groove 59 formed in the sidewall section of the cartridge main body 5, so that, when the tape cartridge 1 is loaded on the cartridge loading section 99, the positioning member 107 is engaged in the positioning groove 59 for positively setting the relative connecting position between the contact terminal 53 and the connection terminal 106. Thus, with the tape cartridge 1, mistaken connection between the connecting terminal mechanism 105 and the connecting terminal 106 may be prohibited from occurring despite the small distance between the neighboring contact terminals 53.

Since the correct electrical connection is established between the contact terminal 53 and the connection terminal 106, readout of the identification information stored in the memory IC 52 and the writing of the identification information in the memory IC 52 may be executed highly reliably by the auxiliary recording/reproducing unit separate from the drive unit adapted for recording/reproducing information signals on or from the magnetic tape 2.

The readout operation of the identification information by the auxiliary recording/reproducing unit is executed prior to or independently of the playback operation of the magnetic tape 2 by the drive device. Thus the information required in connection with the tape cartridge 1 is grasped by the driving device prior to the recording/reproducing operation of the magnetic tape 2. On termination of the recording/reproducing operation, the identification information updated by the auxiliary recording/reproducing unit is stored in the memory IC 52 of the auxiliary memory unit 50 via the connection terminal mechanism 105 electrically connected to the contact terminal 53.

Figure 17:
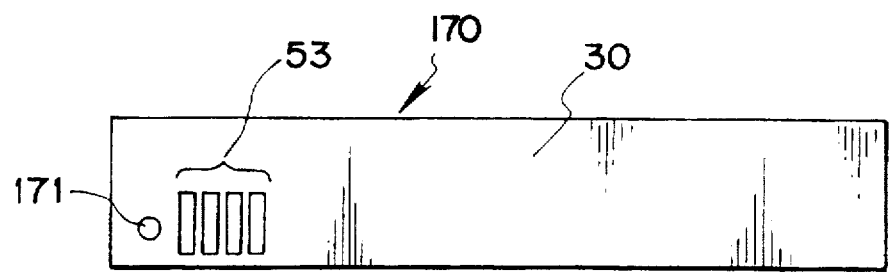
FIG. 17 is a back side view showing another embodiment of the tape cartridge according to the present invention.

With the tape cartridge 1 according to the present invention, the back wall section 30 of the cartridge main body 5 may be formed with a positioning through-hole 171 in adjacency to the contact terminals 53, as shown in FIG. 17. By forming the positioning through-hole 171 in this manner, the positioning member provided in the driving unit is engaged in the positioning through-hole 171 for correctly positioning the tape cartridge 1 when the tape cartridge is loaded on the driving unit. Thus, with the tape cartridge 170, similarly to the tape cartridge 1, the connection terminal 106 of the connection terminal mechanism 105 may be correctly connected with the contact terminals 53.

Figure 18:
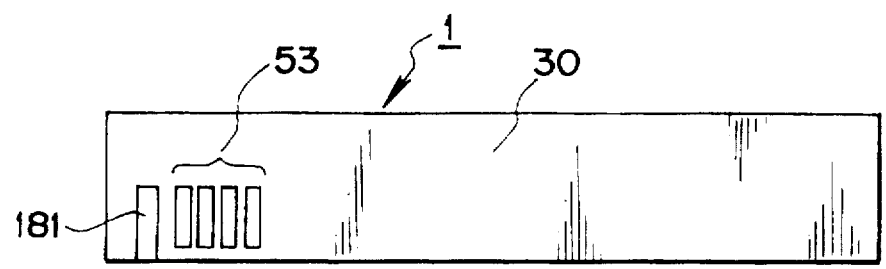
FIG. 18 is a back side view showing still another embodiment of the tape cartridge according to the present invention.

On the other hand, means provided on the back wall section 30 of the cartridge main body 5 for loading the tape cartridge 1 in position on the drive unit may be a positioning groove 181 formed by opening the bottom surface of the cartridge main body 5, as shown in FIG. 18. The positioning groove 181 is continuously formed along the height of the cartridge main body 5 in adjacency to the contact terminals 53. When such tape cartridge 1 is loaded on the drive unit, the positioning member provided on the drive unit is engaged in the positioning groove 181 for correct positioning. Thus, with the tape cartridge 170, similarly to the tape cartridges 1, described previously, the connection terminal 106 of the connection terminal mechanism 105 may be correctly contacted with the contact terminals 53.

Figure 19:
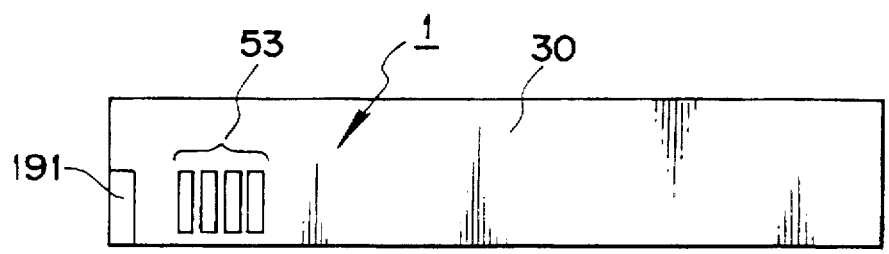
FIG. 19 is a back side view showing yet another embodiment of the tape cartridge according to the present invention.

In addition, the means provided on the back wall section 30 of the cartridge main body 5 for loading the tape cartridge 1 in position on the drive unit may be a rib 191 continuously formed along the height of the back wall section 30, as shown in FIG. 19. When the tape cartridge 1 is loaded on the drive unit, the positioning groove formed in the drive unit is engaged by the rib 191 for correct positioning.

Although the above-described tape cartridges 1 are each so constructed that the connection terminal 106 is formed of an elastic metal material and the resilient flexing force of the connection terminal 106 is utilized for connecting the terminal to the contact terminal 53, the connection terminal mechanism 105 is not limited to this illustrative construction.

For example, the connection terminal mechanism may also be constructed so that the connection terminal is rotated in association with loading of the tape cartridge 1 to the drive unit into contact with the contact terminal 53.

An illustrative construction of the tape cartridge employed in the drive unit having such connection terminal mechanism is hereinafter explained.

In the following description, the portions which are similar to those of the previous embodiment are depicted by the same numerals and detailed description is omitted for clarity.

Figure 20:
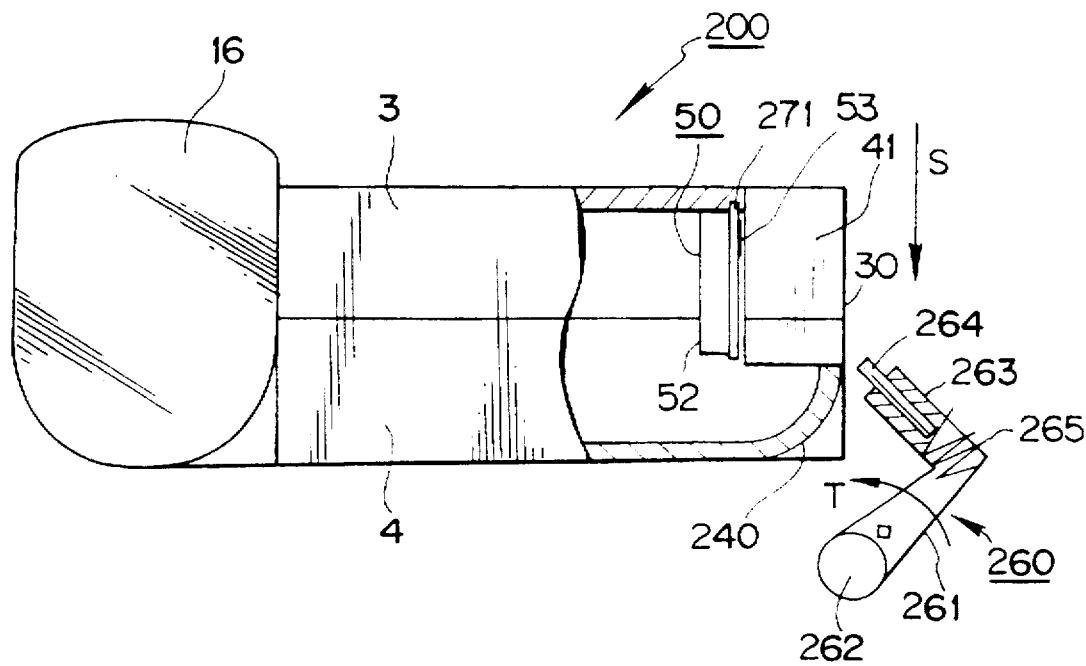
FIG. 20 is a side view showing a rotation type connection terminal mechanism and a disc cartridge employed in a drive device having the connection terminal mechanism, with portions being broken away.
Figure 21:
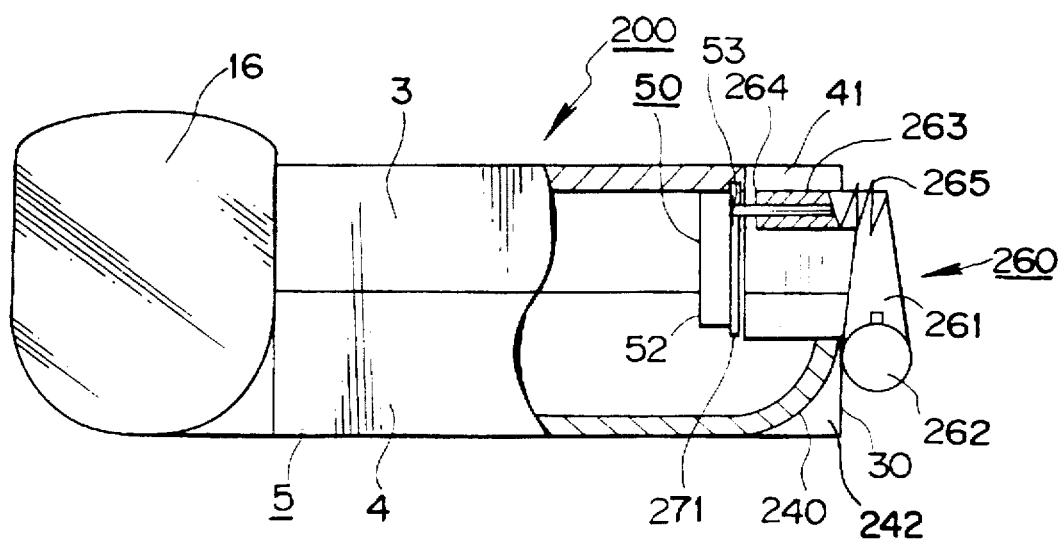
FIG. 21 is a side view showing the state in which the connection terminals provided in the rotation type connection terminal mechanism are contacted with connection terminals of the disc cartridge.

The lower cartridge half 4 of the cartridge main body 5 is provided with a rotating unit 240 for rotating connection terminal mechanism 260 in the vicinity of the contact openings 41. The rotating unit 240 is constructed as a recess having a continuous arcuate bottom wall section from the bottom surface to the back wall 30 of the cartridge main body 5, as shown in FIGS. 20 and 21. The rotating unit 240 is provided on the lower cartridge half 4 in register with the spacing 39 formed at a corner of the cartridge main body 5.

The back wall section 30 of the cartridge main body 5 is provided with a positioning groove 242 traversing the bottom surface of the cartridge main body 5 in proximity to the rotating unit 24. This positioning groove 242 is engaged by a positioning member provided on the cartridge loading unit within the drive unit when the tape cartridge 1 is loaded on the drive unit. Thus the tape cartridge 1 is loaded in position on the cartridge loading unit of the drive unit.

When the tape cartridge is loaded on the cartridge loading section, the connection terminal mechanism 260 is rotated by the rotating unit 240 for contacting a connection terminal 264 with the contact terminal 53.

As for the connection terminal mechanism 260 provided on the drive unit, the connection terminal mechanism is connected to the auxiliary recording/reproducing unit configured for reading out the identification information stored in the memory IC 52 of the auxiliary memory unit 50 or writing the updated identification information in the IC memory 52.

The connection terminal mechanism 260 includes a base portion 261, a cam 262 integrally formed on a lower end of the base portion 261, a terminal support 263 mounted in a direction normal to an upper end of the base portion 261, pin-shaped connection terminals 264 reciprocally supported by the terminal support 263 and a terminal spring 265 for biasing the connection terminals 264 in a direction of being protruded from the terminal support 263.

The base portion 261 has its vertical size approximately equal to the height from the bottom surface of the tape cartridge 1 as far as the contact terminal 53 of the auxiliary memory unit 50. The cam 262 is formed integrally with the base portion 261 and has a width slightly smaller than the opening width of the rotating unit 240 of the tape cartridge 1. The connection terminal mechanism 260 is rotatably supported by a support shaft of the driving unit engaged in a shaft hole, not shown, formed in the cam 262. The connection terminal mechanism 260 is also rotationally biased in a direction opposite to the direction of arrow T in FIG. 20 under the force of a torsion spring, not shown, assembled on the base portion 261.

The above-described connection terminal mechanism 260 is arranged on the bottom surface of the cartridge loading unit of the drive unit. That is, the connection terminal mechanism 260 is rotatably mounted on the cartridge loading section so that the cam 262 is positioned in register with the rotating unit 240 of the tape cartridge 200 loaded in position on the cartridge loading unit. When the tape cartridge 200 is not loaded on the cartridge loading section, the connection terminal mechanism 260 is maintained in such a state that the connection terminals 264 are receded outwardly of the cartridge loading section under the force of the torsion spring assembled on the base portion 261.

Thus, when the tape cartridge 200 is loaded on the cartridge loading section and caused to descend in the direction of arrow S in FIG. 20, the cam 262 of the connection terminal mechanism 260 engaged with the bottom surface of the rotating unit 240 is moved along the arcuate surface towards the back surface 30 of the cartridge main body 5. Thus the connection terminal mechanism 260 is rotated counterclockwise in FIG. 2 as indicated by arrow T in FIG. 20, against the force of the torsion spring. The connection terminals 264 supported by the terminal support 263 are intruded via the contact openings 41 into the cartridge main body 5 into contact with the contact terminals 53 of the auxiliary memory unit 50.

The tape cartridge 200 is loaded in position on the cartridge loading unit of the drive unit, with the positioning groove formed in the sidewall section of the cartridge main body 5 then engaging in the associated positioning member, so that the connection terminals 264 of the connection terminal mechanism 260 are contacted correctly with the contact terminals 53. Thus the connection terminals 264 are rotated into contact with the contact terminals 53 of the auxiliary memory unit. This contact state is maintained by the spring force of the terminal spring 265.

With the above-described contact terminal mechanism 260, the cam 162 engaged with the rotating unit 240 of the tape cartridge 200 and the connection terminals 264 connected to the contact terminals 53 of the auxiliary memory unit 50 are integrally formed via the base portion 261. Alternatively, the connection terminals 264 may be configured for being intruded via a connecting mechanism, such as a link mechanism, from the direction perpendicular to the back wall section 30 of the cartridge main body 5 having the contact openings 41 of the tape cartridge 200.

With the tape cartridge 200 of the present embodiment, a shutter member 271 is provided for covering the contact terminals 53 of the auxiliary memory unit 50. The shutter member 271 has an outer shape and size sufficient to cover the contact openings 41, and is supported for movement on the inner surface of the back wall section 30 of the cartridge main body 5. The shutter member 271 is usually held at a position of closing the contact openings 41 for covering the contact terminals 53 of the auxiliary memory unit 50.

Similarly to the shutter member provided on the tape cartridge 1, the shutter member 271 is thrust by the shutter thrusting member in association with the loading of the tape cartridge 200 on the cartridge loading section so as to be moved for opening the contact openings 41 for allowing the contact terminals 53 of the auxiliary memory unit 50 to face to outside of the auxiliary memory unit 50.

An illustrative example of a tape cartridge configured for moving the shutter member closing the contact terminal of the auxiliary memory unit in association with the unlock operation of the reel lock mechanism locking the tape supply reel 6 and the tape take-up reel 7 is hereinafter explained.

In the following description, the portions similar to those of the previous embodiments are depicted by the same numerals and the detailed description therefor is omitted made for clarity.

Figure 22:
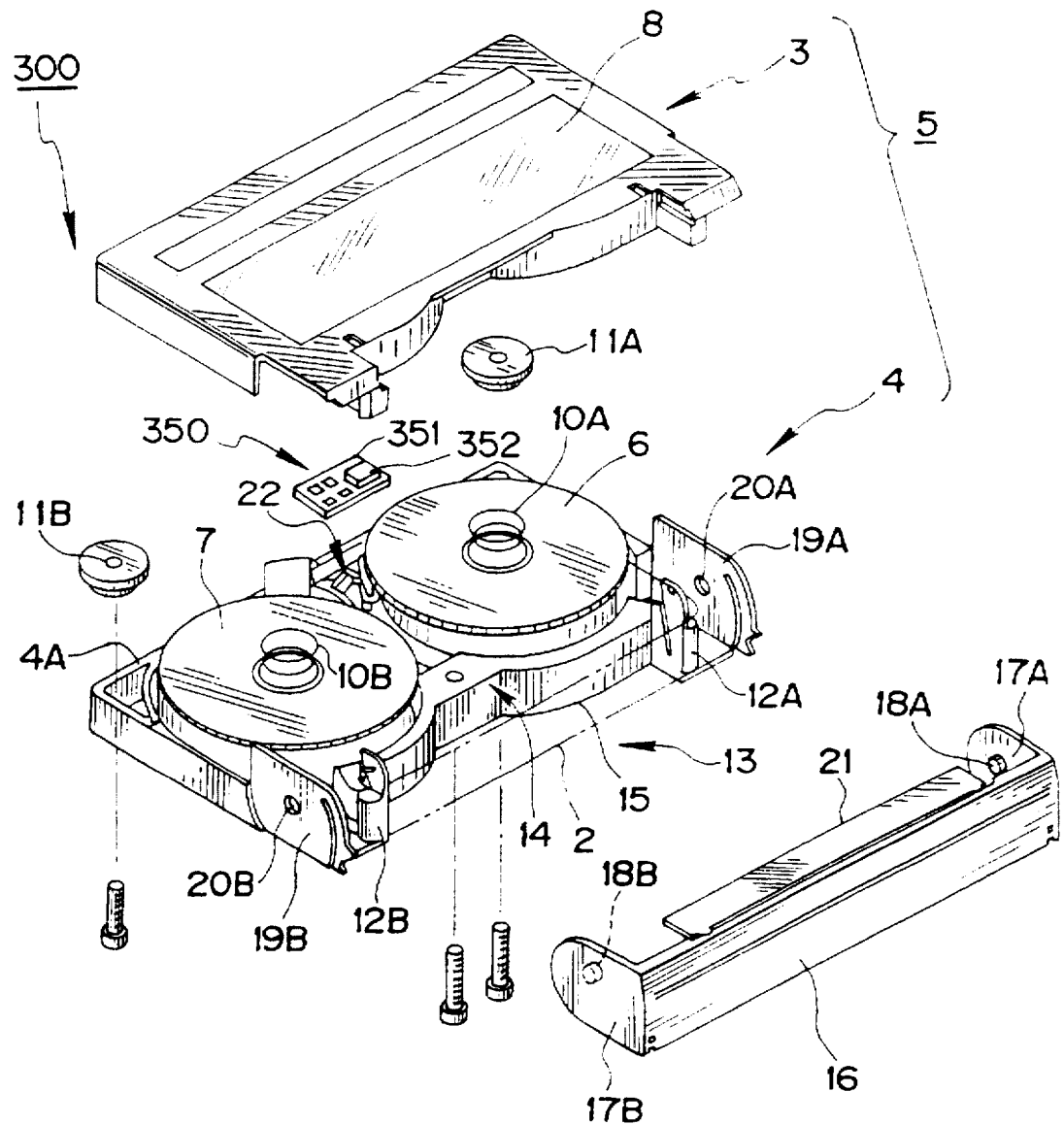
FIG. 22 is an exploded perspective view of a disc cartridge enabling the shutter member to be moved in connection with an operation of unlocking a reel lock mechanism.

With the tape cartridge 300 of the instant embodiment, similarly to the tape cartridge 1, described previously, the tape supply reel 6 and the tape take-up reel 7, around which is placed the magnetic tape 2, are rotatably accommodated within the cartridge main body 5, as shown in FIG. 22.

Figure 23:
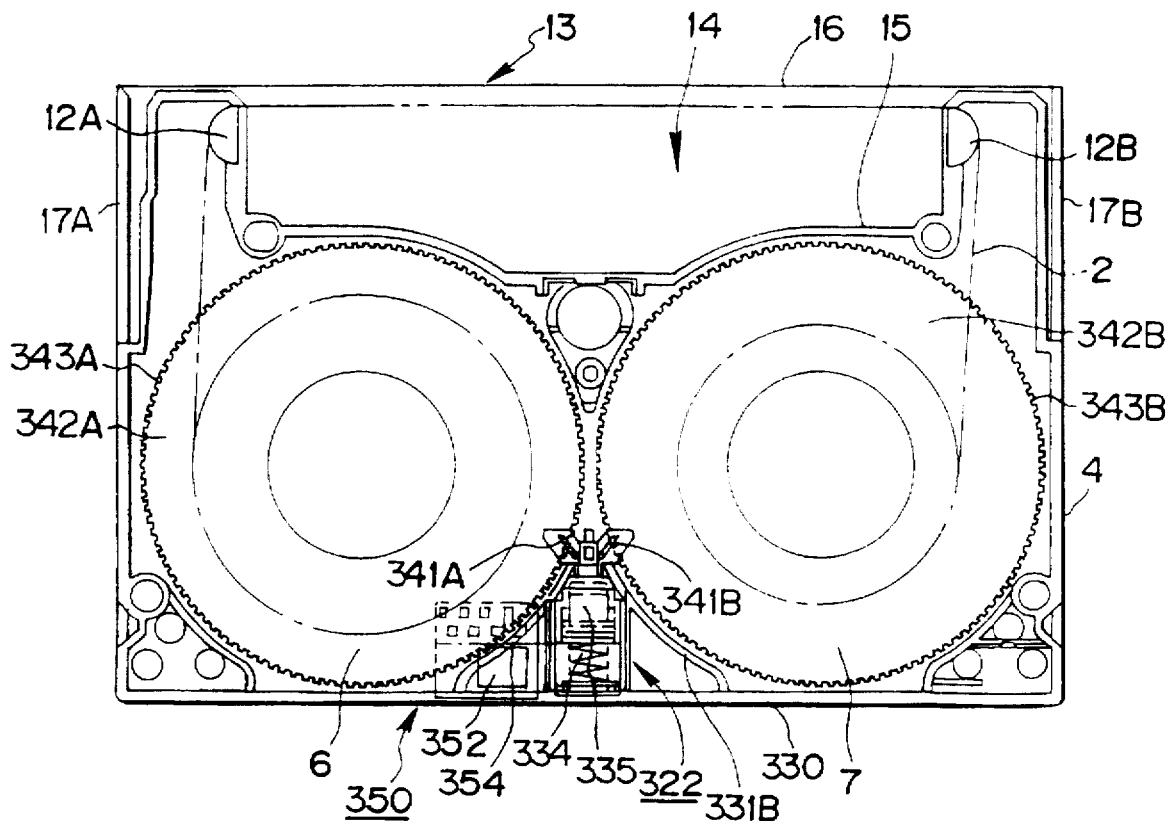
FIG. 23 is a plan view of the disc cartridge with its upper cartridge half being removed.

Within the cartridge main body 5, there is mounted a reel lock mechanism 322 for locking the reels 6, 7 for prohibiting the tape supply reel 6 and the tape take-up reel 7 from being inadvertently rotated for reeling out the magnetic tape 2 placed on the reels 6, 7 outwardly of the cartridge main body 5 during non-use time when the tape cartridge 300 is not loaded on the drive unit, as shown in FIG. 23.

Figure 24:
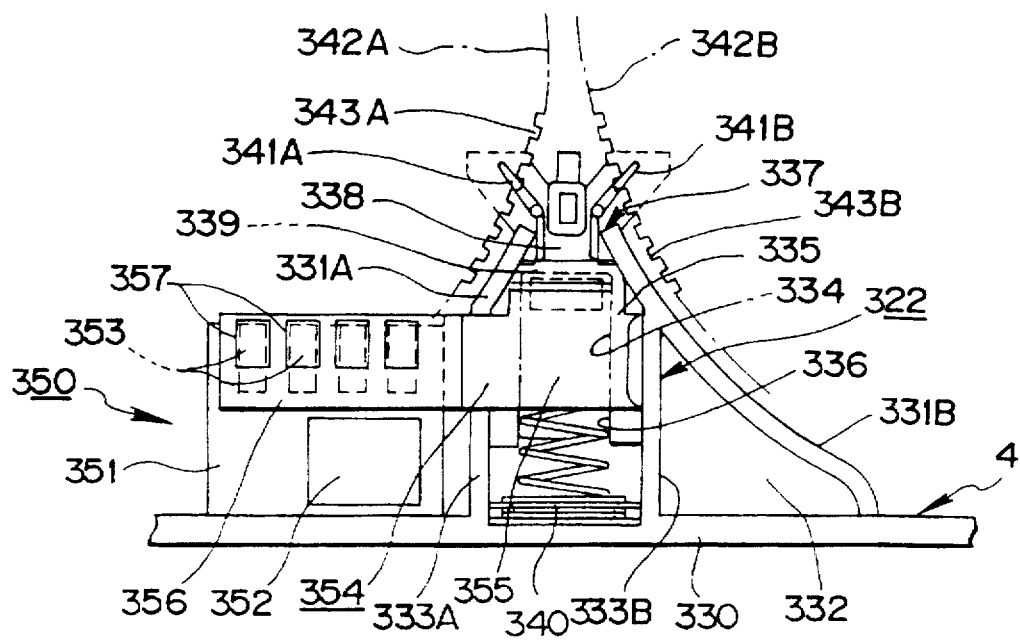
FIG. 24 is a plan view showing the relative position of the reel lock mechanism arranged in the cartridge main body and an auxiliary memory device.

This reel lock mechanism 322 is arranged at a mid portion on the back side of the lower half cartridge 4. That is, arcuately extending reel guide wall sections 331A, 331B, surrounding the outer perimeter of the tape supply reel 6 and the tape take-up reel 7 and continuing to a back wall section 330, are formed upright from and integrally with a bottom surface 332, as shown in FIG. 24.

Thus the back wall section 330 and the tape reel guide wall sections 331A, 331B delimit a substantially triangular spacing in the lower cartridge half 4 between the tape supply reel 6 and the tape take-up reel 7. In addition, a pair of parallel movement guide wall sections 333A, 333B are formed in the triangular-shaped spacing in the lower cartridge half 4 integrally with the bottom surface section 332 for interconnecting the back wall section 330 and the reel guide wall sections 331A, 331B. On the other hand, the bottom surface section 332 is formed with a through-hole 334 in a spacing delimited by the movement guide wall sections 333A, 333B.

A reel unlock member 335 is movably mounted in the spacing delimited by the movement guide wall sections 333A, 333B. The reel unlock member 335 is molded from e.g. a synthetic resin material exhibiting lubricating property and substantially has the shape of a square tube having a spring mounting recess 336 opening on the back surface. The reel unlock member 335 is integrally formed on its forward portion with a lock lever mounting portion 338 protruded into a space between the tape supply reel 6 and the tape take-up reel 7 via a gap 337 defined between the reel guide wall sections 331A, 331B. An actuating portion 339 engaged in the through-hole 334 is formed in the bottom surface of the reel unlock member 335.

Within the spring mounting recess 336 is mounted a coil spring 340 in the compressed state between the recess and the back wall section 330. Thus, in the usual state, the reel unlock member 335 has its front surface abutted against the reel guide wall sections 331A, 331B under the force of the coil spring 340, so that the lock lever mounting portion 338 provided on the front surface is protruded via the gap 337 between the reel guide wall sections 331A, 331B so as to be positioned between the tape supply reel 6 and the tape take-up reel 7.

A pair of lock levers 341A, 341B are rotatably assembled on the lateral surfaces of the lock lever mounting portion 338 of the reel unlock member 335. When the lock lever mounting portion 338 is protruded via the gap 337 between the reel guide wall sections 331A, 331B and positioned between the tape supply reel 6 and the tape take-up reel 7, the lock levers 341A, 341B are held in the outwardly opened state by spring means, not shown, as shown in FIG. 24. On the other hand, the lock levers 341A, 341B are closed towards the lateral side of the lock lever mounting portion 338 in a state in which the lock lever mounting portion 338 is receded into the gap 337 between the reel guides 331A, 331B by the movement of the reel unlock member 335 as later explained.

Meanwhile, engagement teeth 343A, 343B are formed on the entire outer periphery of lower flange portions 342A, 342B of the tape supply reel 6 and the tape take-up reel 7, as shown in FIG. 23. Although the engagement teeth 343A, 343B are formed as salient teeth in the illustrated embodiment, these may be replaced by uni-directional ratchet teeth. Thus the tape supply reel 6 and the tape take-up reel 7 are prohibited from being rotated in idle by engagement of the lock levers 341A, 341B with the engagement teeth 343A, 343B, respectively.

As the above-described reel lock mechanism 322 is loaded on the cartridge loading section of the drive unit using the cartridge loading unit as described above, the actuation member 95 provided on the drive unit is intruded into the through-hole 334 formed in the cartridge main body 5 and engaged with the actuating portion 339 of the reel unlock member 335 for thrusting the actuating member. Thus the reel unlock member 335 is moved along the through-hole 334 against the bias of the coil spring 340. By such operation of the reel unlock member 335, the lock levers 341A, 341B are receded out of engagement with the engagement teeth 343A, 343B of the tape supply reel 6 and the tape take-up reel 7, as the lock levers are closed towards the lateral sides of the lock lever mounting portion 338 by such operation of the reel unlock member 335. Thus the tape supply reel 6 and the tape take-up reel 7 are released from the locked state with the lock levers 341A, 341B.

When the tape cartridge 300 of the illustrated embodiment is loaded on the drive unit, the reel drive shaft of the drive unit is fitted in the hub engagement openings 9A, 9B, as the positioning hole 23 formed in the bottom of the lower cartridge half 4 is engaged by the associated positioning pin.

With the tape cartridge 300 of the illustrated embodiment, similarly to the above-mentioned tape cartridge, an auxiliary memory unit 350 for recording the contents of information signals recorded on the magnetic tape 2, design statements or the state of use of the magnetic tape 2 is arranged within the cartridge main body 5, as shown in FIG. 22. This auxiliary memory unit 350 is made up at least of a wiring substrate 351, the memory IC 352 installed on the wiring substrate 351 and plural contact terminals 353 printed on the wiring substrate 351 and operating as input/output terminals of the memory IC 352, as shown in FIGS. 23 and 24. The wiring substrate 351 is constituted as a so-called double-sided substrate. In the state in which the substrate 351 is assembled on the cartridge main body 5, as explained subsequently, the memory IC 352 and the contact terminals 353 are mounted on the inwardly and outwardly facing major surfaces of the substrate 351, respectively.

Figure 25:
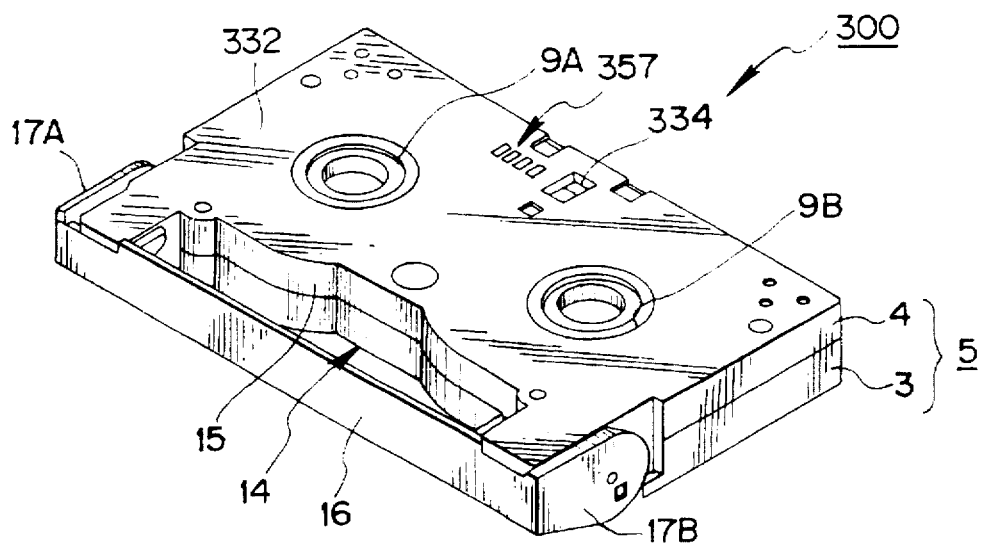
FIG. 25 is a perspective view looking from the bottom side of the tape cartridge.
Figure 29:
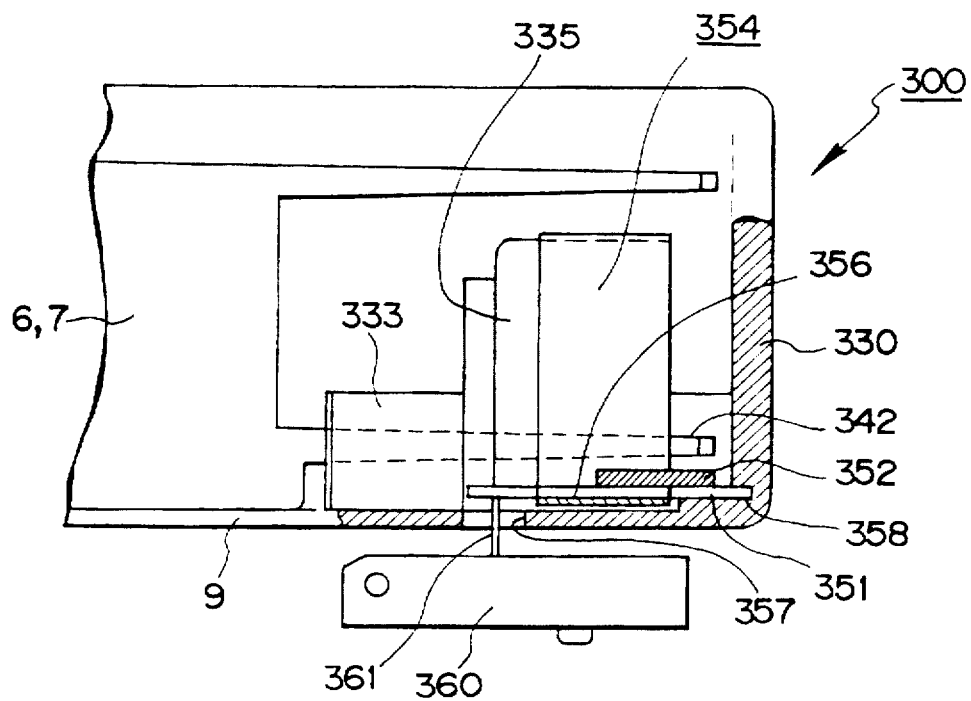
FIG. 29 is a cross-sectional side view showing the state in which the shutter member has caused the contact terminals of the auxiliary memory device to face outward.

The auxiliary memory unit 350 is so designed that the contact terminals 353 are exposed to outside via contact openings 357 formed in the bottom surface 332 of the lower cartridge half 4 constituting the cartridge main body 5 in adjacency to the tape reel lock mechanism 322, as shown in FIG. 25. The auxiliary memory unit 350 is assembled to the lower cartridge half 4 by one end of the wiring substrate 353 being inserted into an inserting groove 358 formed in the back wall section 30 of the lower cartridge half 4, as shown in FIG. 29. The terminal openings 357 are formed as plural rectangular through-holes arrayed in the longitudinal direction in the bottom surface 332 of the lower cartridge half 4, and are sized to permit the contact terminals 353 to be exposed to outside, as shown in FIG. 25. These terminal openings 357 are normally closed by a shutter section 356 of a shutter member 354, as explained subsequently.

Figure 27:
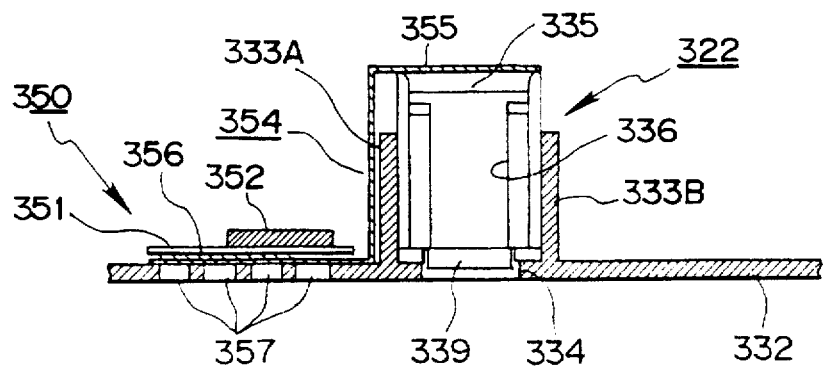
FIG. 27 is a cross-sectional view showing the mounting state of the shutter member and the auxiliary memory device in the cartridge main body.
Figure 28:
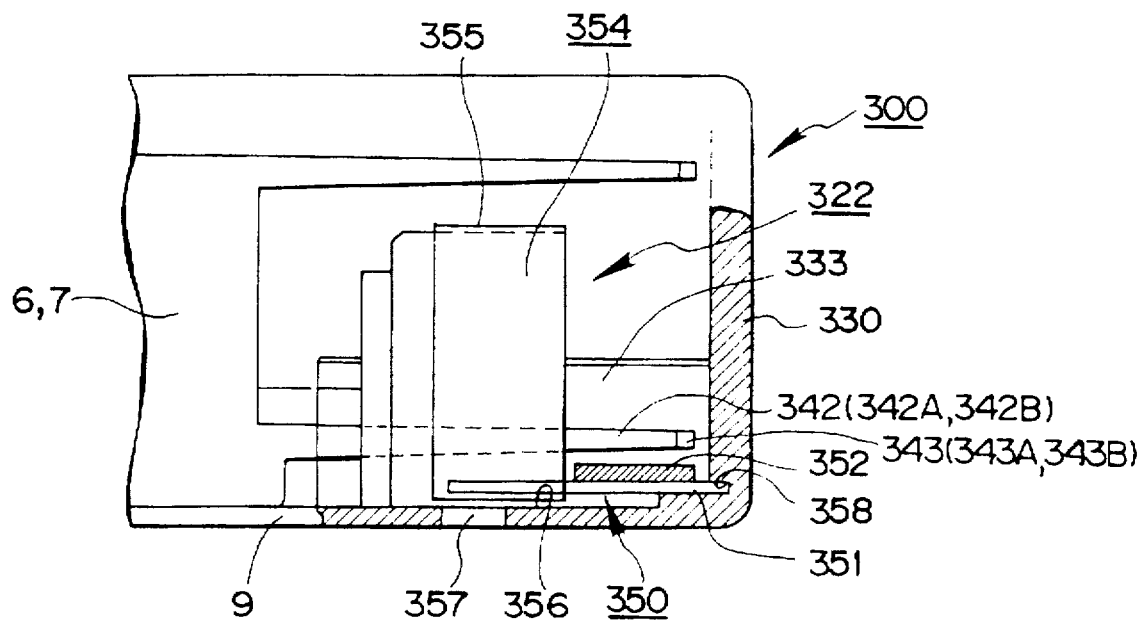
FIG. 28 is a cross-sectional side view showing the shutter member having closed the contact terminals.

The shutter member 354 is a member formed by bending a sheet of a reduced thickness into a crank shape, as shown in FIG. 27. That is, the shutter member has an upper horizontal section 355 secured to the upper surface of the reel unlock member 335 of the tape reel lock mechanism 322, an upstanding portion extending along the outer surface of the slide guide wall section 333A as far as the bottom surface 332 of the lower cartridge half 4 and a lower horizontal section functioning as a shutter section 356. The shutter section 356 is extended in a space between the bottom surface 332 and the wiring substrate 351 of the auxiliary memory unit 350 arranged for extending along the bottom 332 of the lower cartridge half 4. The shutter section 356 has a shape and size sufficient to close the terminal openings 357.

Figure 26:
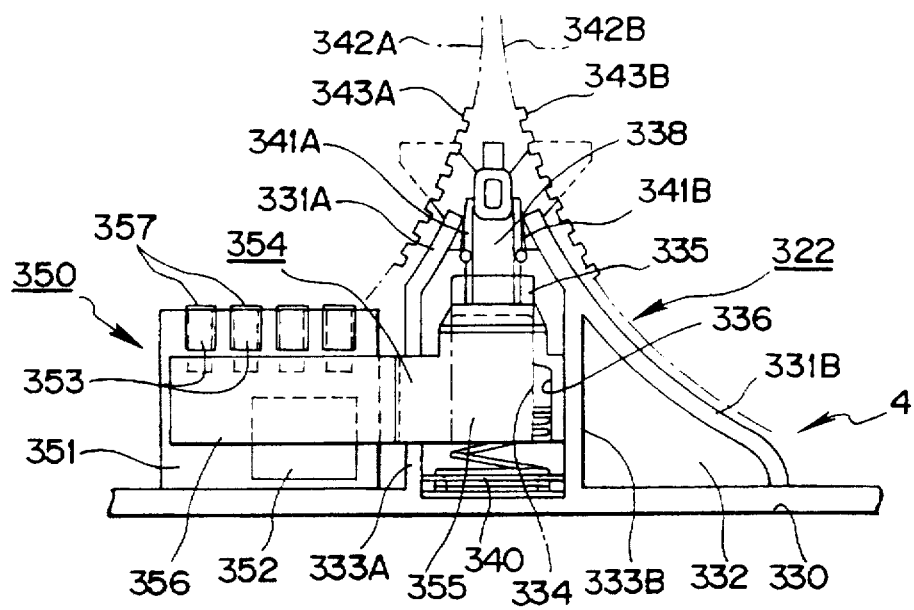
FIG. 26 is a plan view showing the state in which the shutter member has caused the contact terminals of the auxiliary memory device to face outward.

When the tape cartridge 300 is loaded on the drive unit, using the cartridge loading unit, as described previously, the reel unlock member 335 is moved by the actuating member 95 arranged on the drive unit, for unlocking the tape supply reel 6 and the tape take-up reel 7 so far locked by the lock levers 341A, 341B. By such movement of the reel unlock member 335, the shutter member 354 is moved towards the back side of the cartridge main body 5, as shown in FIG. 26. By such movement of the shutter member 354, the shutter section 356 is shifted from the state of closing the contact terminals 353 to the state of exposing the contact terminals 353 to outside of the cartridge main body 5 via the terminal openings 357.

The tape cartridge 300 loaded on the drive unit has a connection terminal mechanism 360 on the side of the auxiliary recording/reproducing unit in association with the terminal openings 357, as shown in FIG. 29. The connection terminal mechanism 360 is connected to the auxiliary recording/reproducing unit configured for reading out the identification information stored in the IC memory 352 and for storing the new identification information in the IC memory 352. The connection terminal mechanism 360 is contacted with the contact terminals 353 of the auxiliary memory unit 350 released from the state closed by the shutter member 354 by the connection terminal 361 being intruded at the terminal opening 357. It is noted that, when the tape cartridge 300 is loaded on the drive unit, the relative position between the tape cartridge 300 and the connection terminal mechanism 360 is determined by a suitable positioning mechanism, not shown.

The auxiliary recording/reproducing unit reads out the identification information stored in the IC memory 352 of the auxiliary memory unit 350 via the connection terminal mechanism 360 electrically connected with the contact terminals 353 by the loading operation of the tape cartridge 300 on the drive unit. The operation of reading out the identification information by the auxiliary recording/reproducing unit is carried out prior to or independently of the loading operation of the magnetic tape 2. Thus the information required in connection with the tape cartridge 300 is grasped by the driving unit without carrying out the recording/reproducing operation of the magnetic tape 2. On termination of the recording/reproduction of the information signals on or from the magnetic tape 2, the new identification information is stored by the IC memory 352 of the auxiliary recording unit 350 via the connection terminal mechanism 360 electrically connected to the contact terminals 353 by the auxiliary recording/reproducing unit.

When the tape cartridge 300 is taken out of the drive unit by the reverse operation of the loading operation of the tape cartridge 300 by the cartridge loading device, the reel unlock member 335 of the reel lock mechanism 322 is restored to the initial position under the bias of the coil spring 340. The lock levers 341A, 341B are again engaged with the engagement teeth 343A, 343B of the tape supply reel 6 and the tape take-up reel 7 for locking the reels 6 and 7. The shutter member 354 is restored to its initial position in association with the restoration operation of the reel unlock member 335 for closing the contact openings 357 by the shutter section 356. Thus the contact terminals 353 are covered by the shutter member 354 and protected against unneeded external force or deposition of dust and dirt.

Figure 30:
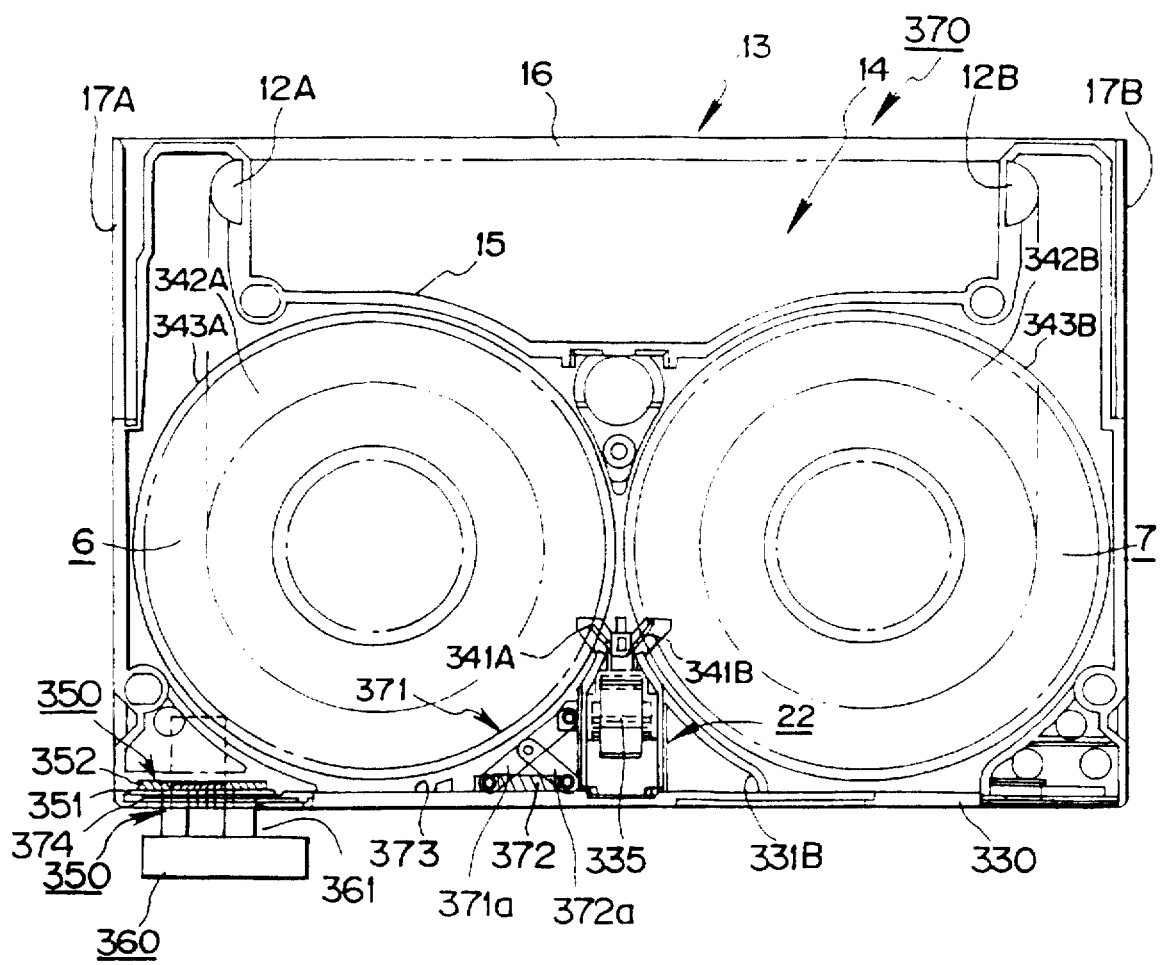
FIG. 30 is a plan view of another embodiment of a disc cartridge enabling the shutter member to be moved in connection with an operation of unlocking a reel lock mechanism.
Figure 31:
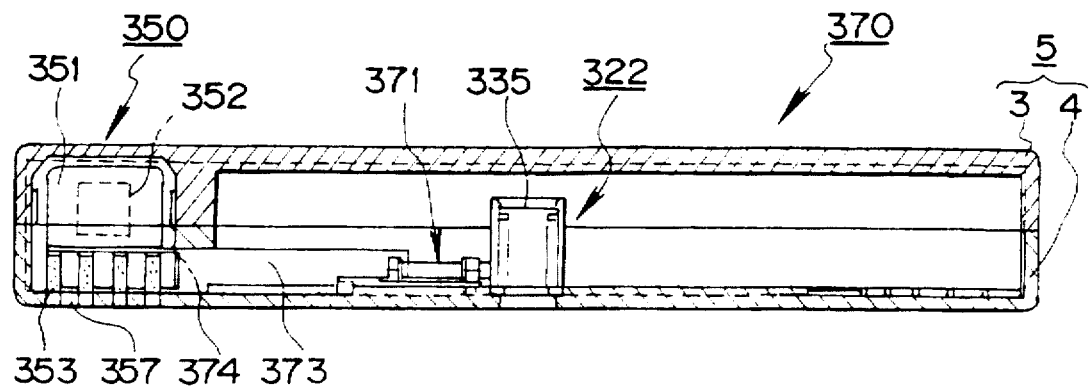
FIG. 31 is a longitudinal cross-sectional view of the tape cartridge.

Referring to FIGS. 30 and 31, a modified embodiment in which the contact terminals 353 of the auxiliary memory unit 350 are exposed to outside in association with the unlocking of the tape supply reel 6 and the tape take-up reel 7 is explained.

Similarly to the tape cartridge 300, the tape cartridge 370 includes a shutter member 373 configured for opening and closing the contact terminals 353 of the auxiliary memory unit 350, and the shutter member 373 is moved by the reel unlock member 335 of the tape reel lock mechanism 322. With the present tape cartridge 370, the auxiliary memory unit 350 is arranged at a corner of the tape supply reel side along the back wall section 330 of the cartridge main body 5. The corner of the tape cartridge 370, the bottom surface area of which is provided with e.g., tape design statement discrimination opening etc., represents a space highly effective for arranging the auxiliary memory unit 350 in the limited inner space in the tape cartridge 370.

The auxiliary memory unit 350 is assembled in the cartridge main body 5 so that its major surface carrying the IC memory 352 will face the inner side and its other major surface having the contact terminals 353 printed thereon will face the back side wall section 330 of the cartridge main body 5. Although not shown, the auxiliary memory unit 350 is assembled by inserting the wiring substrate 351 into an inserting groove formed at a portion of an arcuate tape reel guide wall section provided at a corner of the tape cartridge. The back wall 330 is provided with the contact opening 357 in register with the contact terminals 353. Between the back side wall section 330 and the wiring substrate 351 of the auxiliary memory unit 353, there is defined a gap into which is introduced the shutter section 374 of the shutter member 373.

In the illustrated tape cartridge 370, in which the auxiliary memory unit 350 is arranged at a corner thereof, a link mechanism 371 constituted by first and second link levers is provided between the shutter member 373 configured for opening and closing the contact terminal 353 and the reel lock mechanism 322 provided at a mid portion of the tape cartridge 370 for actuating the shutter member 373. That is, one end of a first link lever 371a constituting the link mechanism 371 is connected to the reel unlock member 335 of the tape reel lock mechanism 322. The first link lever 371a has its other end abutted against the back side wall section 330 of the cartridge main body 5 while having its mid position connected to one end of the second link lever 372a the other end of which is abutted against the back side wall section 330.

Between the first link lever 371a and the second link lever 372a is installed a coil spring 372 in an extended state. The shutter member 373 is biased towards right in FIG. 30 under the bias of the coil spring 372 so that the shutter section 374 closes the contact openings 357 associated with the contact terminals 353. The shutter section 374 is comb-shaped for delimiting plural shutter sections each of an outer shape to close the contact openings 357.

When the above-described tape cartridge 370 is loaded on the drive unit using the tape loading unit as described previously, the reel unlock member 335 is moved by the actuating member 95 provided in the driving unit for unlocking the tape supply reel 6 and the tape take-up reel 7 so far locked by the lock levers 341A, 341B. By such movement of the reel unlock member 335, the shutter member 373 is moved towards left in FIG. 30 against the bias of the coil spring 372 via the link mechanism. By such movement of the shutter member 373, the shutter section 374 is shifted from the state of being positioned in register with the contact openings 357 for closing the contact terminals 353 to the state of exposing the contact terminals 353 to outside of the cartridge main body 5 via the terminal openings 357.

The contact terminals 353 of the cartridge main body 5, thus exposed to outside, are contacted by the connection terminals 361 of the contact terminal mechanism 360 which is intruded via the contact openings 357. By the loading of the tape cartridge 370 on the tape cartridge 370, the auxiliary recording/reproducing unit reads out the identification information stored in the IC memory 352 of the auxiliary memory unit 350 via the connection terminal mechanism 360 electrically connected to the contact terminals 353.

When the tape cartridge 370 is taken out of the drive unit the reel unlock member 335 of the tape reel lock mechanism 322 is restored to an initial position, under the bias of the coil spring 340. The lock levers 341A, 341B are again engaged with the tape supply reel 6 and the tape take-up reel 7 for locking these reels 6, 7. The shutter member 354 is restored to an initial position, in association with the restoration operation of the reel unlock member 335, under the bias of the coil spring 372 provided in the link mechanism 371, for closing the contact openings 357 by the shutter section 356. Thus the contact terminals 353 of the auxiliary memory unit 350 is covered by the shutter member 354 for prohibiting deposition of dust and dirt and exertion of an un needed external force.

An illustrative example of a tape cartridge, in which the shutter member configured for closing the contact terminals of the auxiliary memory unit 350 is moved in association with rotation of the front lid 16 covering the front surface 13 of the cartridge main body 5 along which runs the magnetic tape 2 reeled out from the tape supply reel 6 of the cartridge main body 5, is hereinafter explained.

In the following description, the portions similar to those of the previous embodiments are depicted by the same numerals and the detailed description therefor is omitted for clarity.

Figure 32:
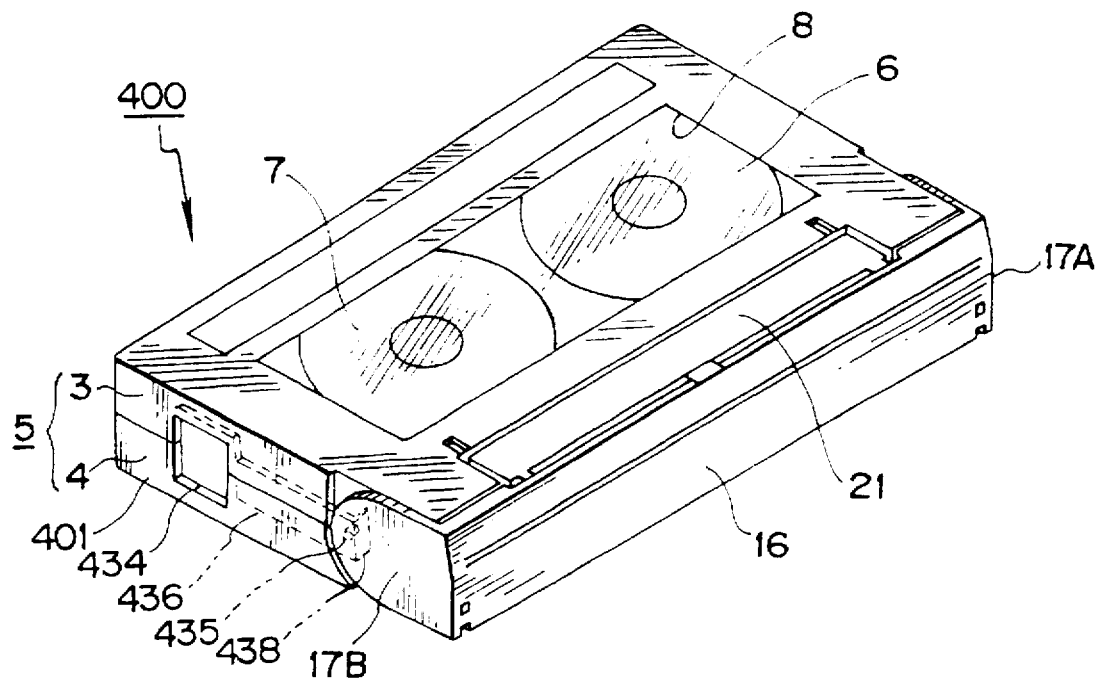
FIG. 32 is a perspective view showing a tape cartridge enabling a shutter member to be moved in connection with rotation of a front lid.

A tape cartridge 400 of the present embodiment includes an auxiliary memory unit 430 for recording the identification information, such as the contents of the information signals recorded on the magnetic tape 2, design statements or the state of use of the magnetic tape 2. This auxiliary memory unit 430 is provided for extending along the inner surface of the sidewall section 401 of the cartridge main body 5, as shown in FIGS. 32, 33 and 34.

Figure 34:
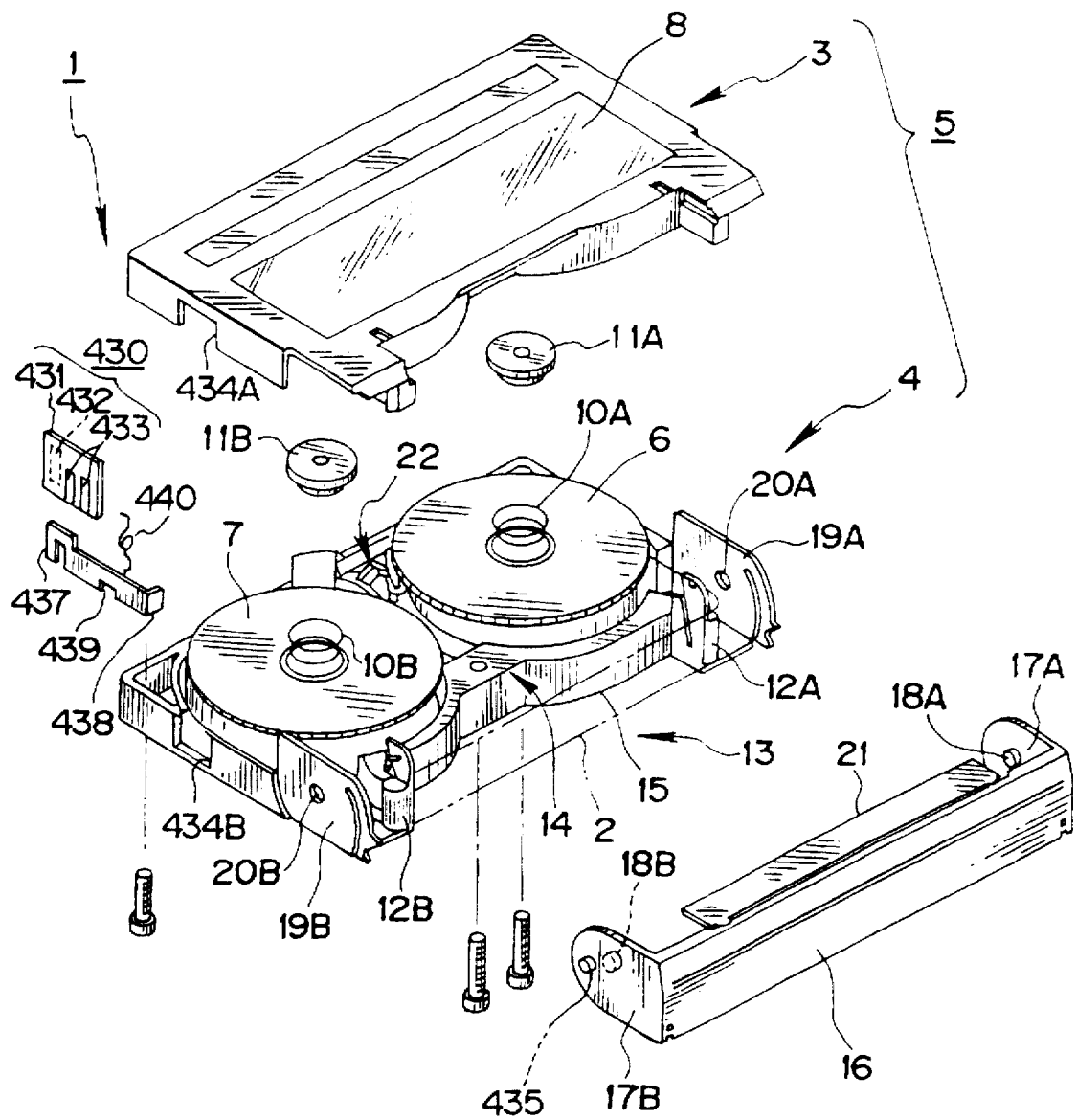
FIG. 34 is an exploded perspective view showing an inner mechanism of the tape cartridge.
Figure 35:
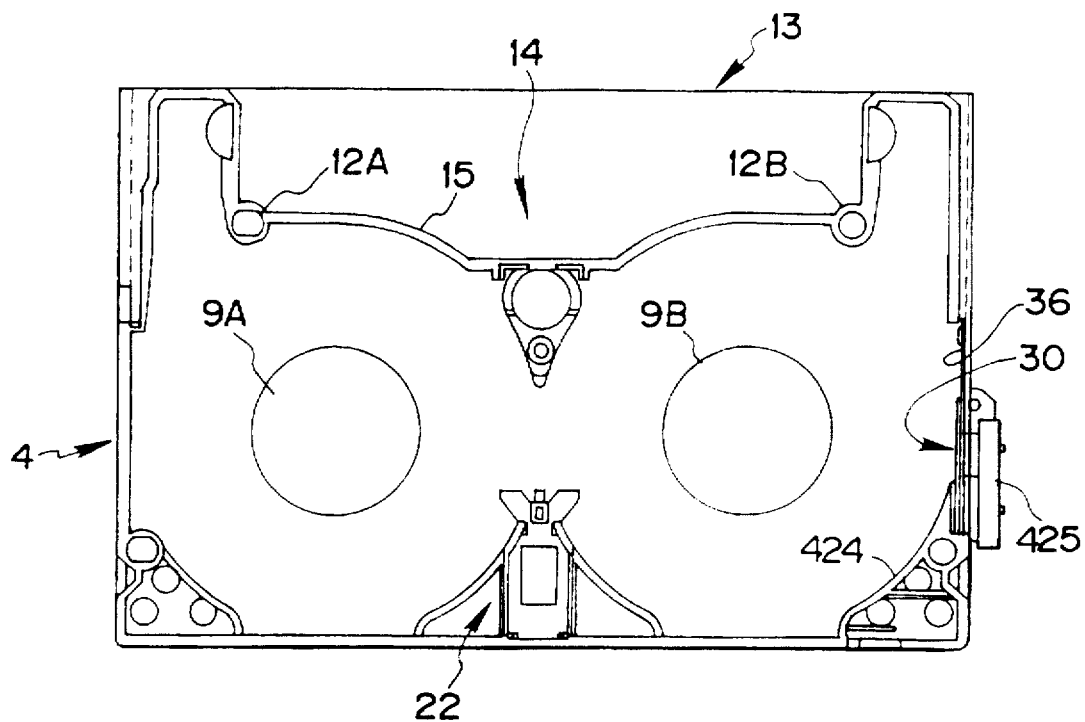
FIG. 35 is a plan view showing the mounting state of the auxiliary memory device housed within the tape cartridge.

Similarly to the auxiliary memory unit 350, this auxiliary memory unit 430 is made up at least of a wiring substrate 431, a memory IC 432 installed on the wiring substrate 431 and plural contact terminals 433 printed on the wiring substrate 431 and operating as input/output terminals of the memory IC 432, as shown in FIG. 34. The wiring substrate 431 is constituted as a so-called double-sided substrate. When the substrate 431 is assembled on the cartridge main body 5, as explained subsequently, the memory IC 432 and the contact terminals 433 are mounted on the inwardly and outwardly facing major surfaces of the substrate 431, respectively.

Figure 33:
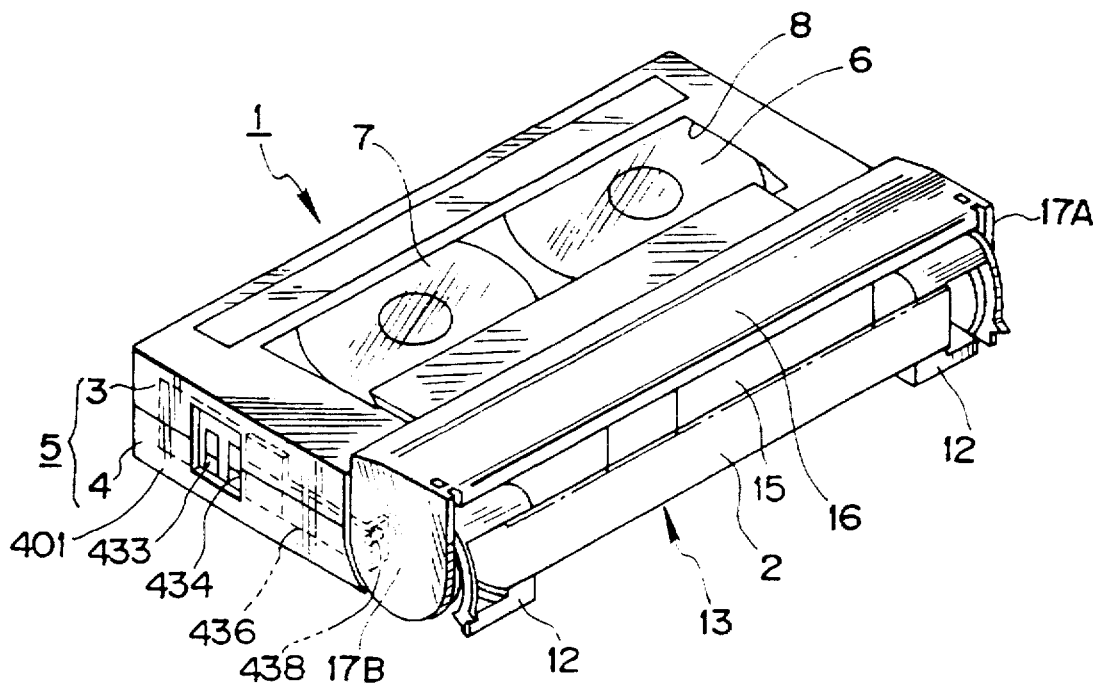
FIG. 33 is a perspective view showing the state in which the front lid rotatably mounted on the front side has been rotated.

The auxiliary memory unit 430 is configured so that the contact terminals 433 are exposed to outside via a terminal opening 434 formed in the sidewall section 401 of the cartridge main body 5, as shown in FIGS. 33 and 34. The terminal opening 434 is delimited by confronting U-shaped openings 434A, 434B formed in the sidewall sections of the upper and lower cartridge halves 3, 4 making up the cartridge main body 5. The terminal opening 434 is usually covered by a shutter section 437 of the shutter member 436.

Figure 36:
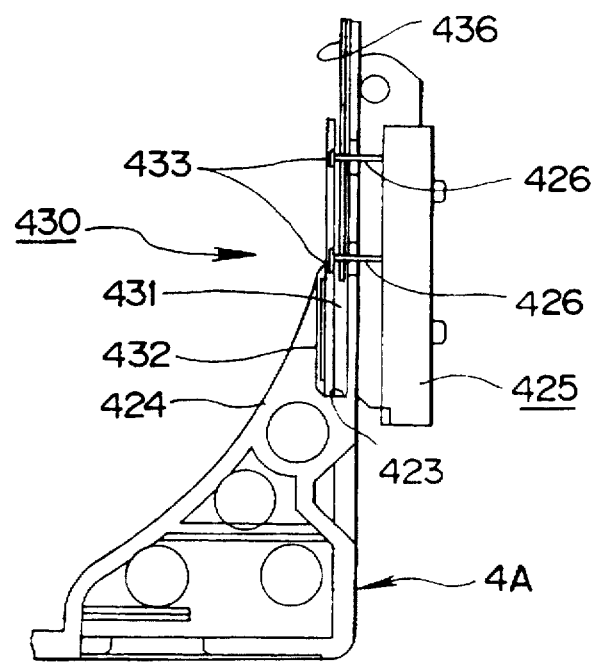
FIG. 36 is an enlarged plan view showing the auxiliary memory device housed within the tape cartridge.
Figure 37:
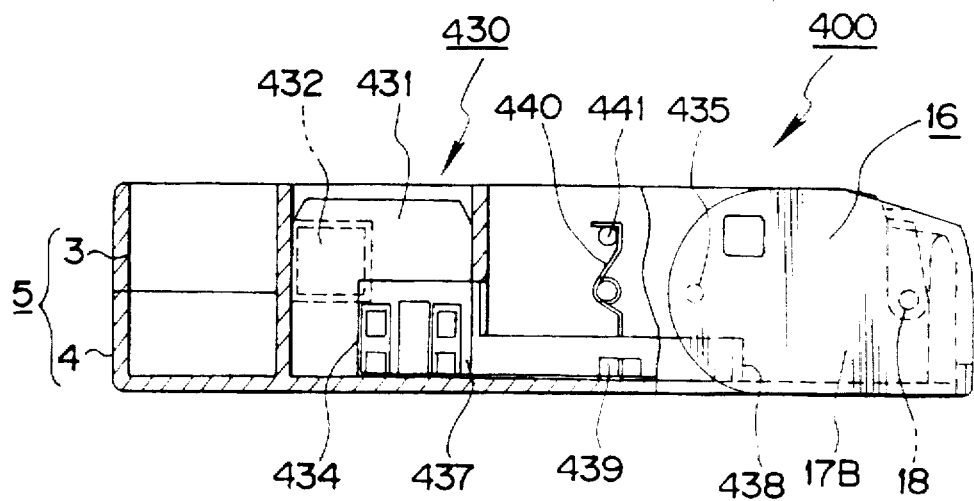
FIG. 37 is a cross-sectional side view of the tape cartridge showing the relative position between the auxiliary memory device arranged within the cartridge main body and the shutter member.

The lower cartridge half 4 formed with the terminal opening 434 has a vertically extending substrate inserting groove 423 in an inner surface of the sidewall section 4A thereof in the vicinity of the terminal opening 434. Specifically, the substrate inserting groove 423 is formed in an arcuate corner wall 424 formed at a corner of the lower cartridge half 4 for surrounding the outer periphery of a flange of the tape take-up reel 7, as shown in FIG. 36. Thus the wiring substrate 431 is assembled to the lower cartridge half 4 by having its proximal portion inserted into the substrate inserting groove 423, with the contact terminals 433 facing the terminal opening 434, as described previously.

The shutter member 436 is extended forwards along the sidewall section 401 of the cartridge main body 5, and has an engagement portion 438 formed at its end portion. The engagement portion 438 is engaged with an engagement pin 435 formed on the inner surface of the opposite sidewall section 17B of the front lid 16. The shutter member 436 is formed in its entirety as a sheet and has a shutter section 437 and an engagement section 438 at its one and the opposite end portions, as shown in FIG. 34. The shutter section 437 is U-shaped and sized to close the terminal guide opening 434 in its entirety. The shutter member 436 is formed at its lower edge portion with a cut-out 439 engaged by an end of a torsion coil spring 440. The torsion coil spring 440 has its other end engaged with a retention pin 441 formed on the inner surface of the sidewall section of the upper cartridge half 3, as shown in FIG. 38.

Figure 38:
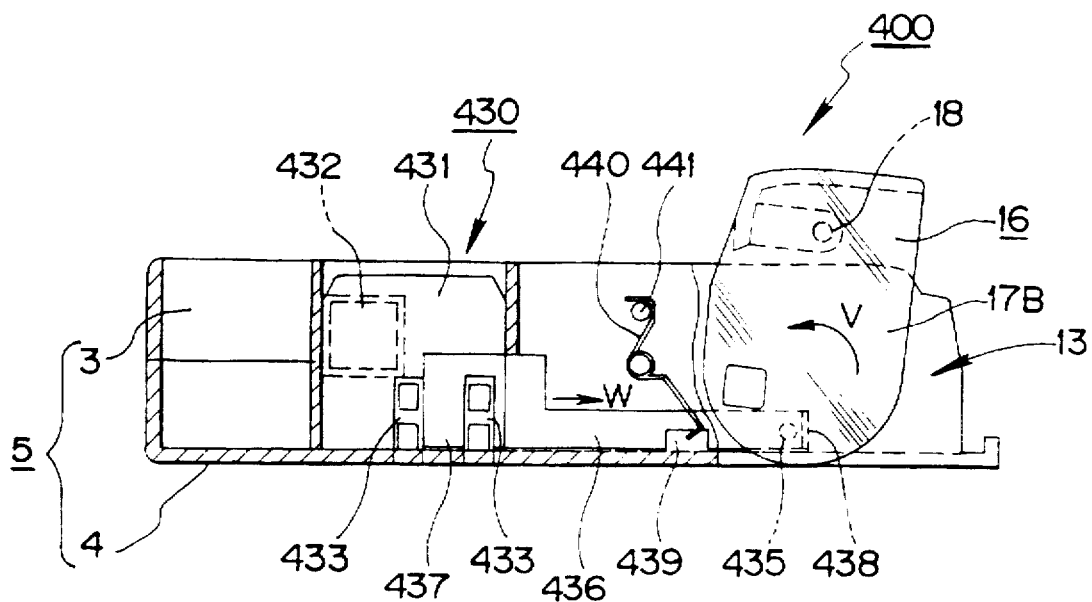
FIG. 38 is a cross-sectional side view of the tape cartridge showing the state in which the front lid has been rotated for moving the shutter member for causing the contact terminals to face outwardly of the cartridge main body.

When the tape cartridge 400 is loaded on the drive unit via the tape cartridge loading unit as described above, the front lid 16 is thrust by the lid opening member 93 so as to be rotated in a direction of arrow v in FIG. 38 for opening the front surface 13 of the cartridge main body 5. By such rotation of the lid member 16, the shutter member 436 is moved in a direction of arrow w in FIG. 38 towards the front side of the cartridge main body 5, as shown in FIG. 38, as a result of movement of the engagement pin 435 engaged with the engagement portion 438. By such movement of the shutter member 436, the shutter section 437 is moved from the state of covering the contact terminals 433 to a state of exposing these contact terminals 433 via the terminal opening 434 to outside of the cartridge man body 5.

On the other hand, when the tape cartridge 400 is loaded on the drive unit, the connection terminal mechanism 425 on the side of the auxiliary recording/reproducing unit is positioned in register with the terminal opening 434. The connection terminal mechanism 425 is connected to the auxiliary recording/reproducing unit configured for reading out the identification information stored in the memory IC 432 and for storing the new identification information in the memory IC 432. The connection terminal mechanism 425 is contacted with the contact terminals 433 of the auxiliary recording/reproducing unit 430 opened by the shutter member 436 on intrusion of the spring terminal 426 via the terminal opening 434.

Although the shutter member 436 for opening and closing the contact terminals is constituted in the illustrated embodiments as a sole member directly connected to the lid member 16, the shutter section 437 may be adapted for being driven by a suitable connection mechanism depending upon the mounting position of the contact terminals 433.

Although the above description has been made of the tape cartridge having a magnetic tape having a tape width of 8 mm, the present invention may similarly be applied to a tape cartridge having a magnetic tape of alternative design statements, or a recording medium device comprising a cartridge main body housing a recording medium for other information signals.

The identification information may also be stored in memory elements other than the memory IC.

The auxiliary recording/reproducing unit may be constituted by a dedicated auxiliary recording/reproducing unit separated from the drive unit, in place of being enclosed within the drive unit. For example, the auxiliary recording/reproducing unit may be provided in a stocker housing a large number of tape cartridges.

INDUSTRIAL APPLICABILITY

Since the recording medium device of the present invention has its contact terminals covered by the shutter member arranged on the cartridge main body, it is protected against an external force and deposition of dust and dirt by the shutter member. Thus the contact terminals may be kept in the clean state at all times. When the recording medium device is loaded on the recording and/or reproducing apparatus, the shutter member is moved by an opening mechanism provided on the recording and/or reproducing apparatus for exposing the contact terminals to outside of the cartridge main body. Thus there is no risk of destruction of a connector device of an external equipment connected to the contact terminals due to collision of the connecting terminals against the shutter member for assuring positive connection of the connector device to the contact terminals.

We claim:

1. A recording medium device comprising:
   a cartridge main body housing therein a recording medium for recording information signals thereon;
   contact terminals mounted within and facing to the outside of the cartridge main body and functioning as electrical contacts for a drive unit; and
   a shutter member arranged on said cartridge main body for selectively exposing and covering said contact terminals, said shutter member having a size and shape proportioned to said contact terminals.

2. The recording medium device as claimed in claim 1 wherein said cartridge main body is formed with an outer peripheral wall and said contact terminals are exposed to the outside of the cartridge main body via an opening formed in the outer peripheral wall.

3. The recording medium device as claimed in claim 2 wherein said shutter member when not loaded on said drive unit is held in a position of covering said opening, said shutter member when loaded on the drive unit being moved by shutter opening means arranged on said drive unit to a position of uncovering said opening for exposing said contact terminals to the outside of the cartridge main body.

4. The recording medium device as claimed in claim 3 further comprising biasing means for biasing said shutter member in a direction of covering said opening.

5. The recording medium device as claimed in claim 2 further comprising a memory device mounted in said cartridge main body for electrical connection to said contact terminals for storing identification information of said recording medium.

6. The recording medium device as claimed in claim 5 further comprising a wiring substrate carrying said memory device, said contact terminals being provided on said wiring substrate.

7. The recording medium device as claimed in claim 6 wherein a pair of tape reels are rotatable mounted in said cartridge main body, said cartridge main body is formed with an outer peripheral wall and a reel guide wall defining a corner, said wiring substrate is a magnetic tape placed around said tape reels, and said wiring substrate is arranged at said corner.

8. The recording medium device as claimed in claim 1 further comprising positioning means provided within said cartridge main body for positioning said contact terminals relative to said drive unit.

9. The recording medium device as claimed in claim 1 wherein said cartridge main body comprises a rotating section for rotating a connection terminal mechanism provided in said drive unit towards said contact terminals.

10. The recording medium device as claimed in claim 9 wherein said cartridge main body is formed with a back surface and a bottom surface defining a corner having an arcuate section and said rotating section comprises said arcuate section.

11. A recording medium device comprising:
a cartridge main body having a through-hole formed therein;
a pair of tape reels rotatably supported within said cartridge main body;
a pair of flanges respectively formed on said tape reels;
a tape-shaped recording medium placed around said tape reels;
biasing means;
a reel lock mechanism having a lock lever and a reel unlock member, said lock lever being rotationally biased by said biasing means in a direction of engaging said flanges for limiting rotation of said tape reels, said reel unlock member at least partially facing said through-hole formed in said cartridge main body and being adapted for engagement by actuating means provided in a drive unit for moving said lock lever away from said flanges against the bias of said biasing means;
a memory device enclosed within said cartridge main body for storing identification information of said tape-shaped recording medium;
contact terminals electrically connected with said cartridge main body and functioning as electrical contacts for said drive unit; and
a shutter member moved with said reel unlock member for selectively exposing and covering said contact terminals, said shutter member having a size and shape proportioned to said contact terminals.

12. The recording medium device as claimed in claim 11 wherein said shutter member when not loaded on said drive unit is held in a position of covering said opening, said shutter member when loaded on the drive unit being moved by said reel unlock member to a position of uncovering said contact terminals, said reel unlock member being moved by actuating means arranged in said drive unit and extending into said through-hole.

13. The recording medium device as claimed in claim 12 further comprising biasing means for biasing said shutter member in a direction of closing said opening.

14. The recording medium device as claimed in claim 11 wherein said contact terminals face to the outside of the cartridge main body and wherein said shutter member has a first end connected to said reel unlock member and has a second end formed with a shutter section, said shutter section being moved along said cartridge main body with said reel unlock member.

15. The recording medium device as claimed in claim 11 wherein at least said lock lever, said reel unlock member, and the shutter member are formed as a unitary member.

16. The recording medium device as claimed in claim 11 further comprising a wiring substrate carrying said memory device, said contact terminals being provided on said wiring substrate.

17. The recording medium device as claimed in claim 16 wherein said contact terminals are exposed to the outside of said cartridge main body via an opening formed in said cartridge main body.

18. The recording medium device as claimed in claim 17 comprising a connecting mechanism connecting said reel unlock member and said shutter member for movement in directions perpendicular to each other.

19. The recording medium device as claimed in claim 11 wherein said contact terminals are exposed to the outside of said cartridge main body via an opening formed in said cartridge main body and wherein a connecting mechanism for moving said shutter member with said reel unlock member is further provided between the reel unlock member and said shutter member for selectively exposing and covering said contact terminals.

20. A recording medium device comprising:
a cartridge main body having a front side;
a pair of tape reels rotatably supported within said cartridge main body;
a pair of flanges respectively formed on said tape reels;
a tape-shaped recording medium placed between said tape reels and extending along said front side;
a front lid pivotally mounted on said cartridge main body for opening and closing said front side;
a memory device enclosed within said cartridge main body for storage of identification information of said tape-shaped recording medium;
contact terminals electrically connected with said memory device for functioning as electrical contacts for a drive unit; and
a shutter member for opening and closing said contact terminals with pivoting of said front lid, said shutter member having a size and shape proportioned to said contact terminals.

21. The recording medium device as claimed in claim 20 further comprising biasing means for biasing said shutter member in a direction of covering said contact terminals, said shutter member being moved against the bias of said biasing means responsive to pivoting of said front lid to a position of opening the front side of said cartridge main body for exposing said contact terminals.

22. The recording medium device as claimed in claim 21 wherein said front lid has an actuating member and wherein said shutter member has an end formed with a thrust portion, said thrust portion being thrust by said actuating member when said front lid is pivoted in a direction of opening the front side of said cartridge main body.

23. The recording medium device as claimed in claim 20 further comprising a wiring substrate carrying said memory device, said contact terminals being provided on said wiring substrate.

24. The recording medium device as claimed in claim 23 wherein said contact terminals face outward via an opening formed in said cartridge main body.

25. The recording medium device as claimed in claim 24 wherein said wiring substrate has two sides and an engagement holder is formed on opposite sides of said opening on an inner surface of said cartridge main body, said engagement holder being engaged by both sides of said wiring substrate.

* * * * *